Sept. 15, 1970  C. E. SCHOU  3,528,322
TRANSMISSION ASSEMBLY
Original Filed Sept. 1, 1966  11 Sheets-Sheet 1

INVENTOR
CARL E. SCHOU
BY Strauch, Nolan, Neale, Nius & King
ATTORNEYS

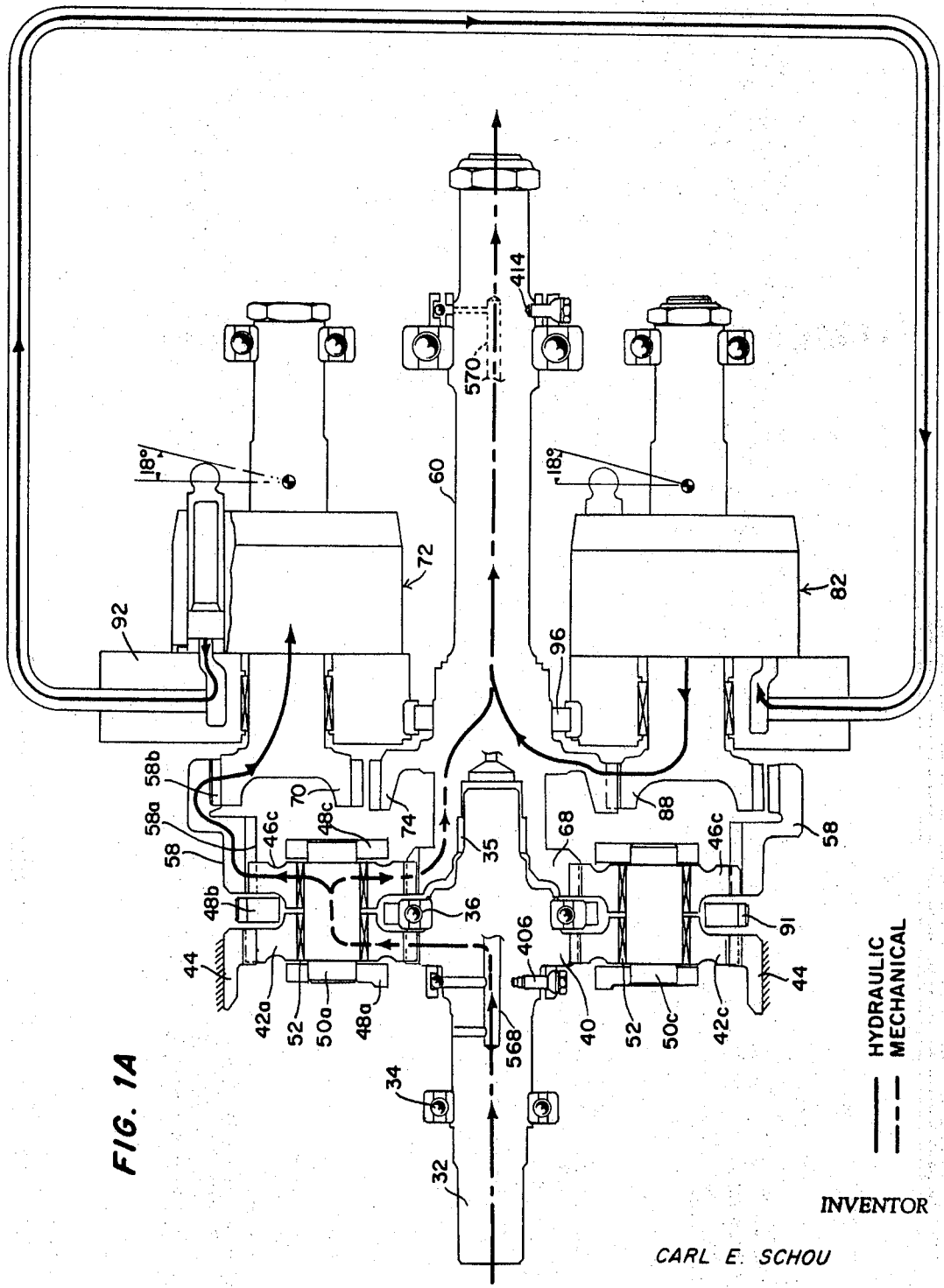

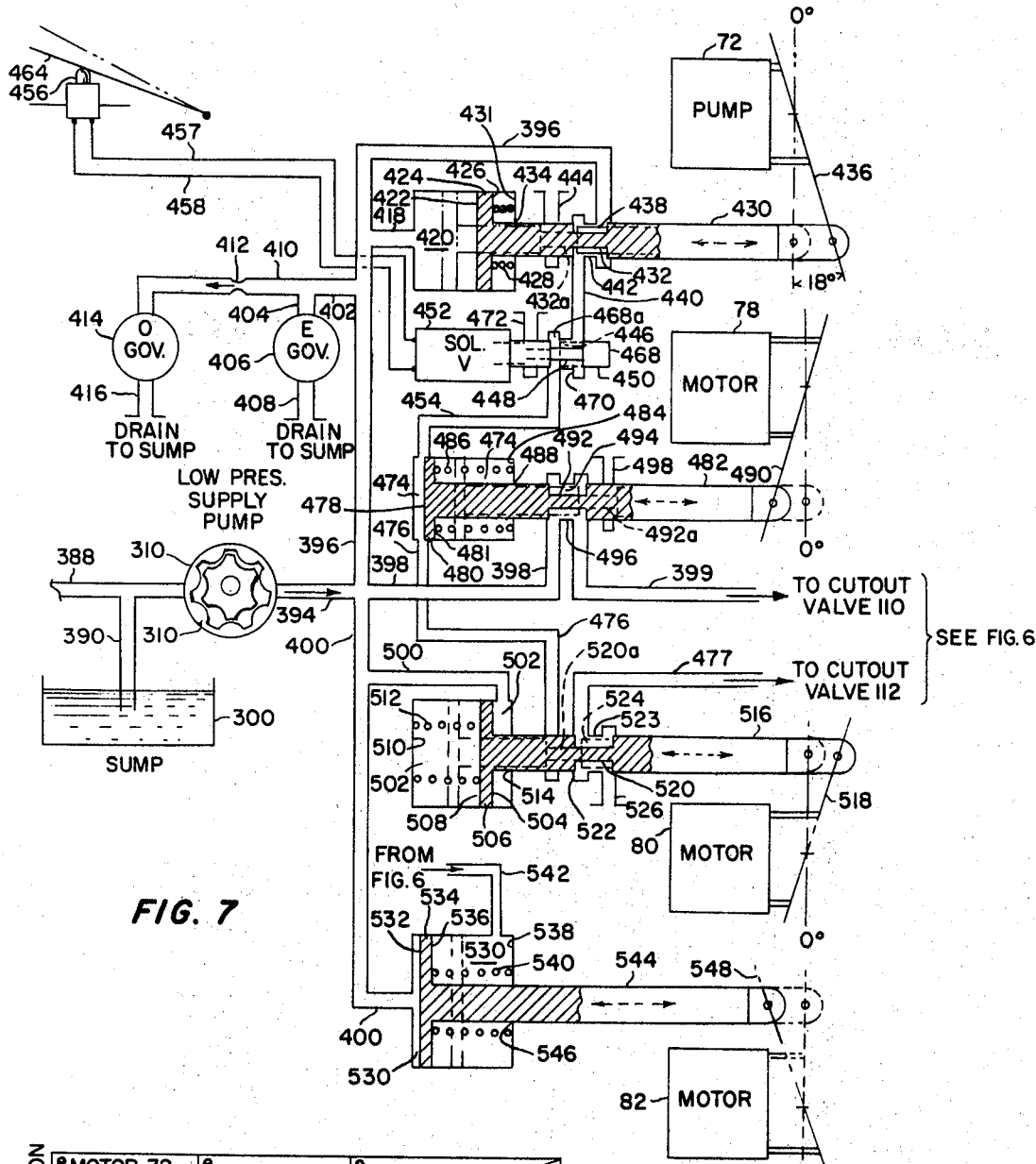
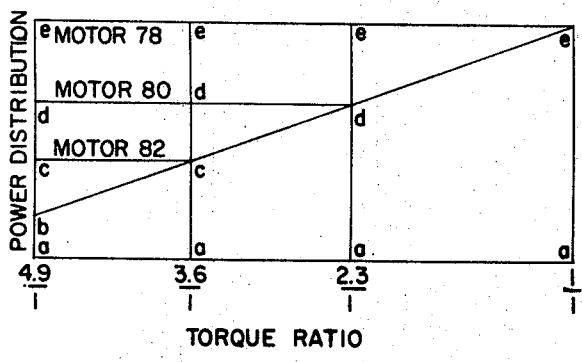

FIG. 11

Sept. 15, 1970     C. E. SCHOU     3,528,322

TRANSMISSION ASSEMBLY

Original Filed Sept. 1, 1966     11 Sheets-Sheet 9

FIG. 12

INVENTOR
CARL E. SCHOU

ATTORNEYS

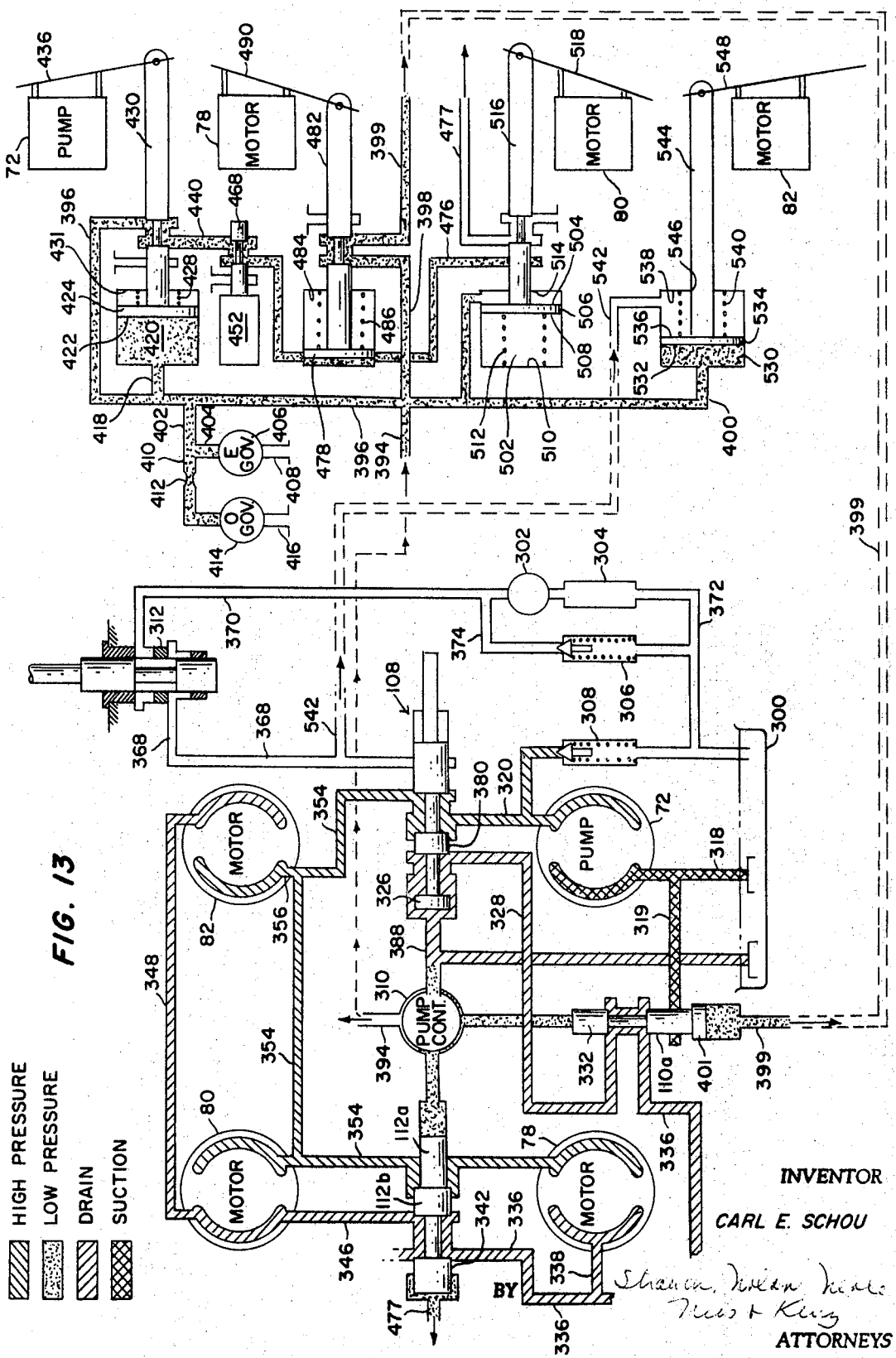

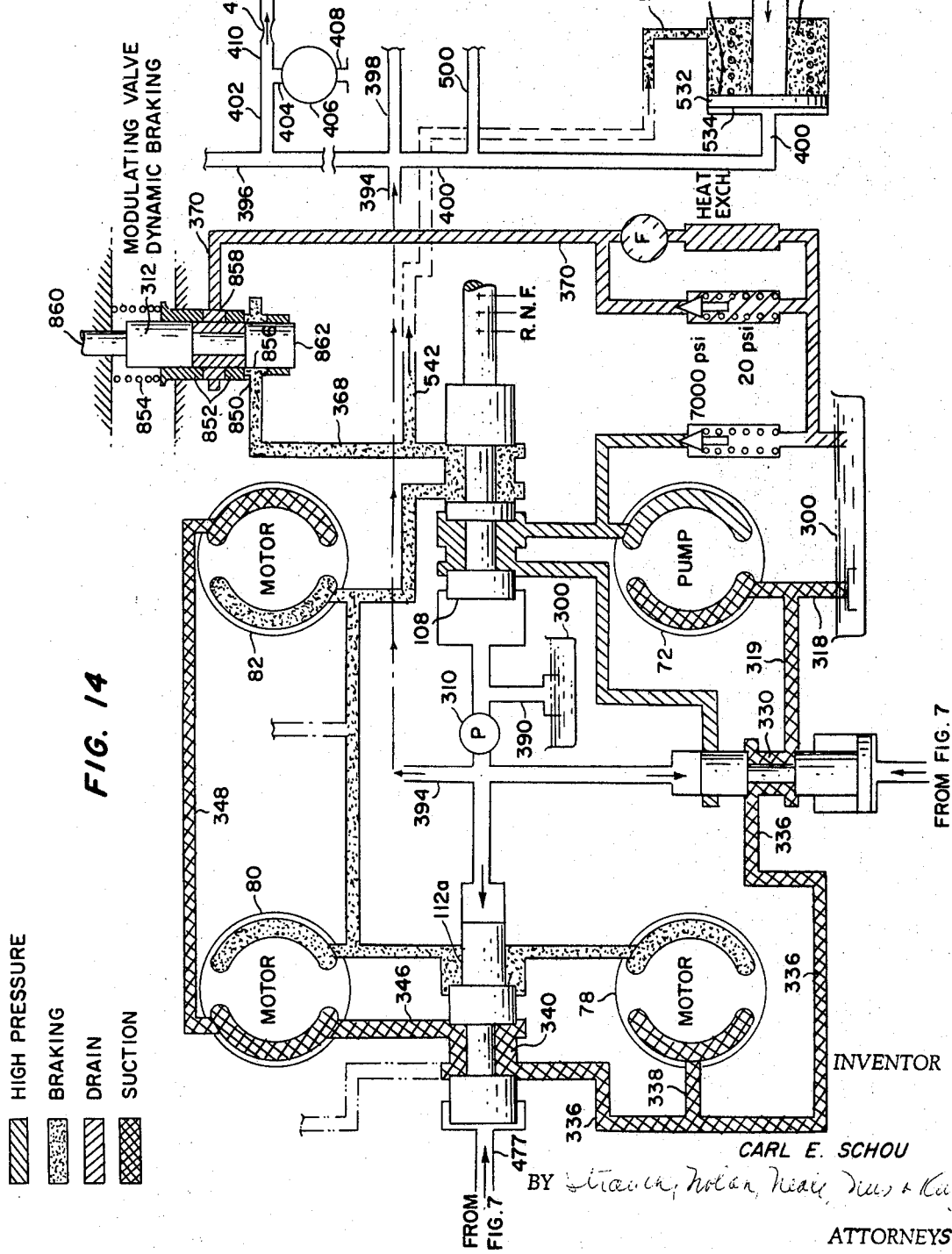

United States Patent Office 3,528,322
Patented Sept. 15, 1970

3,528,322
TRANSMISSION ASSEMBLY
Carl E. Schou, Bloomfield Hills, Mich., assignor to North American Rockwell Corporation, Pittsburgh, Pa., a corporation of Delaware
Original application Sept. 1, 1966, Ser. No. 576,696, now Patent No. 3,465,616, dated Sept. 9, 1969. Divided and this application Mar. 24, 1969, Ser. No. 809,815
Int. Cl. F16h 47/04
U.S. Cl. 74—687                 15 Claims

ABSTRACT OF THE DISCLOSURE

A transmission assembly housing structure has longitudinal compartments spaced by a fixed internal valve housing and hydraulic passage defining member. Input torque transmitting gearing is disposed in one compartment, and torque transmitting assembly in the other compartment comprises a pump and a plurality of hydraulic motors. The pump is driven by the input gearing, and an output shaft is drive connected to the hydraulic torque transmitting assembly. The housing structure contains a hydraulic system comprising a sump and passages interconnecting the sump, pump and motor. These passages are disposed substantially wholly in the internal housing member and movable control valves are mounted in the passages between said pump and the motors.

---

This is a division of my copending application Ser. No. 576,696, filed Sept. 1, 1966 for Vehicle Drive, now Letters Patent No. 3,465,616 dated Sept. 9, 1969.

The present invention relates to the compact structural association of components of an infinitely variable range. In its preferred embodiment it is incorporated in a hydromechanical transmission.

The development of hydromechanical transmissions in recent years to make available the advantages of automatically shifted, infinitely variable power transmissions for long-haul intercity operated trucks is well known. However, said transmissions have not gained popular acceptance in the commercial trucking industry due to several disadvantages which offset the attractiveness of using such transmissions. These disadvantages relate to the size of the hydromechanical transmission in that they tend to be over dimensioned, use elaborate gearing and control circuitry to perform the shifting operations.

It is the major object of this invention to provide a novel compact and highly efficient organization of components in a hydrostatic transmission assembly wherein an input mechanical gearing and a set of hydraulic components comprising a pump driven from the gearing and a plurality of motors operated from the pump are spaced by an internal housing member of special structure, this member containing fluid passages leading from a sump into the pump, from the pump to the motors and from the motors to the sump, and selectively operable control valves are movably mounted wholly in such passages.

Further objects will become apparent in connection with the appended claims and the annexed drawings wherein:

FIG. 1A is a power flow diagram for the transmission taken substantially along line 1A—1A of FIG. 1;

FIG. 7 is a diagrammatic representation of the low pressure automatic control system of the present invention;

Figure 1:
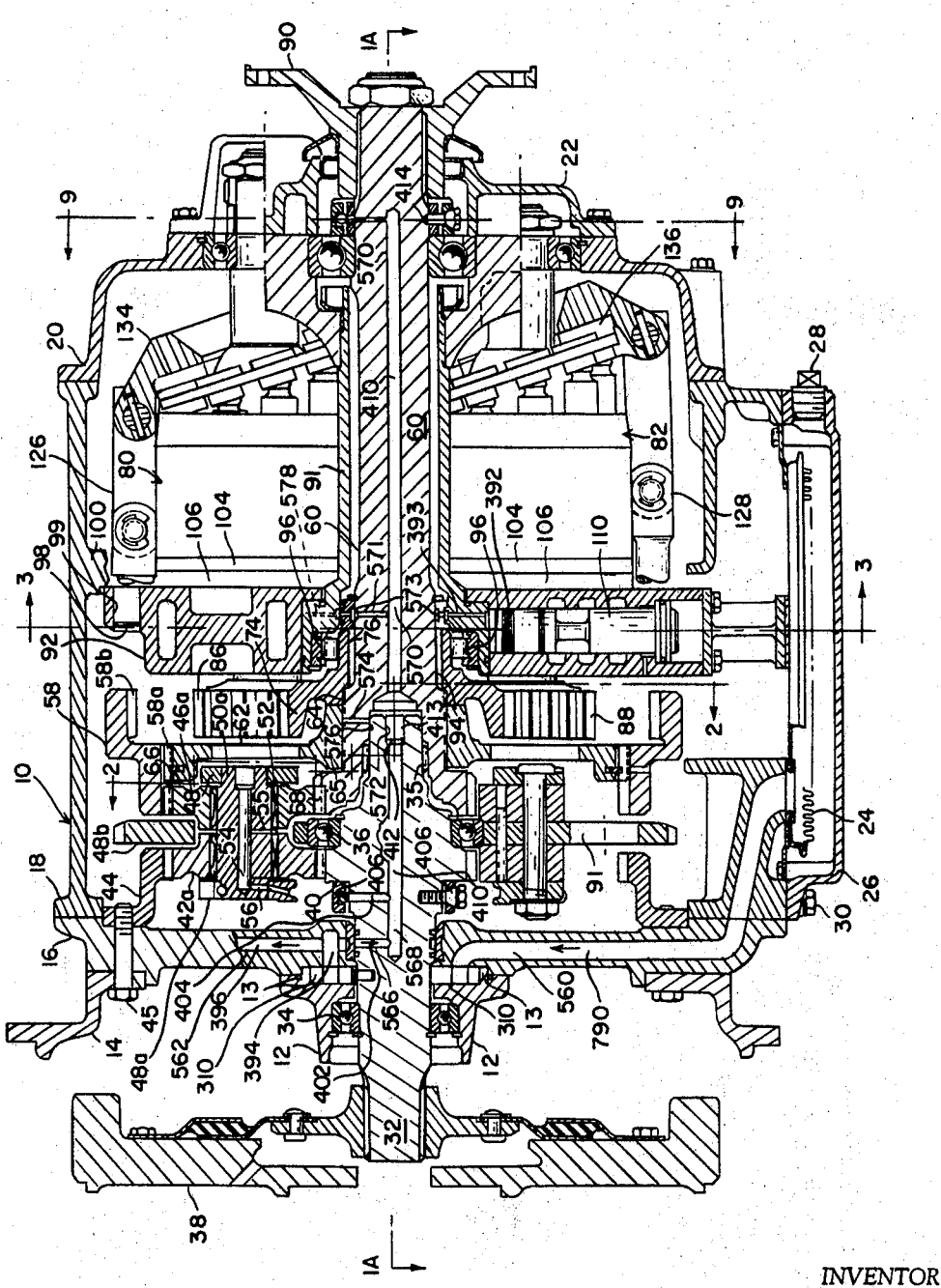
FIG. 1 is a longitudinal sectional view illustrating the general assembly of a hydromechanical transmission embodying the present invention.
Figure 9:
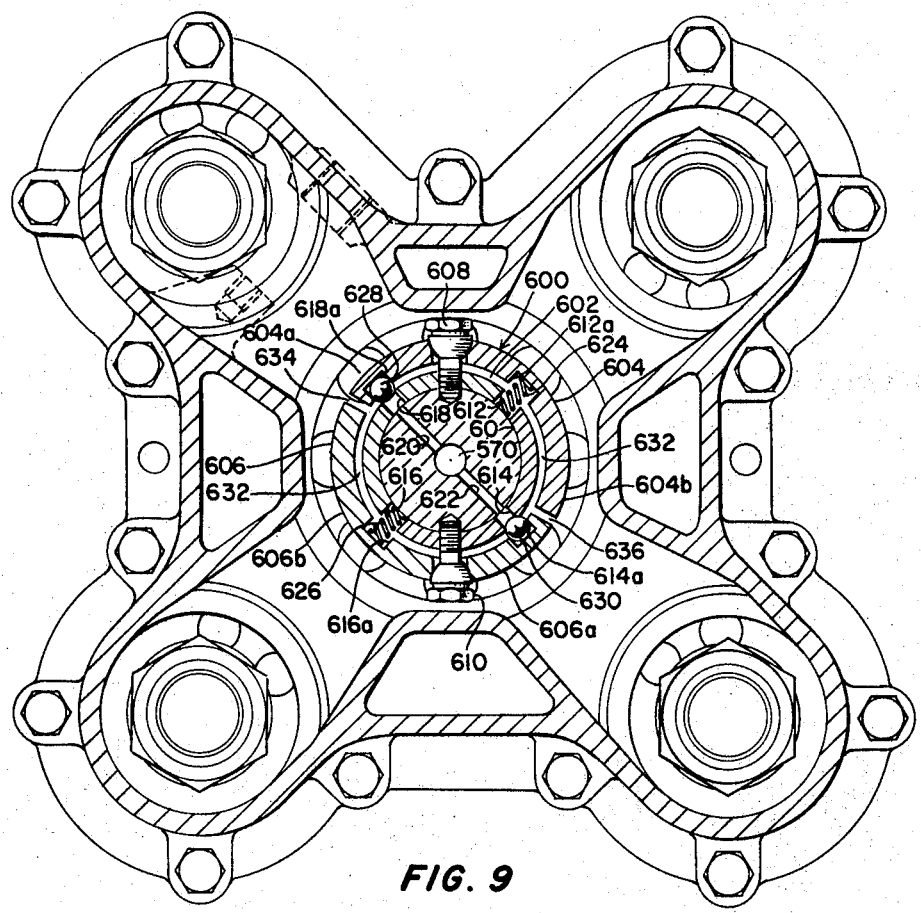
Figure 8A:
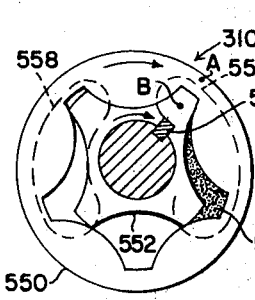

FIGS. 8A, B, C and D are a series of sectional views through the gerotor type pump illustrating a complete pumping cycle;

FIG. 9 represents a section taken substantially along line 9—9 of FIG. 1;

FIG. 10 is a diagrammatic representation of the power distribution for various operating torque speed ratio;

Figure 11:
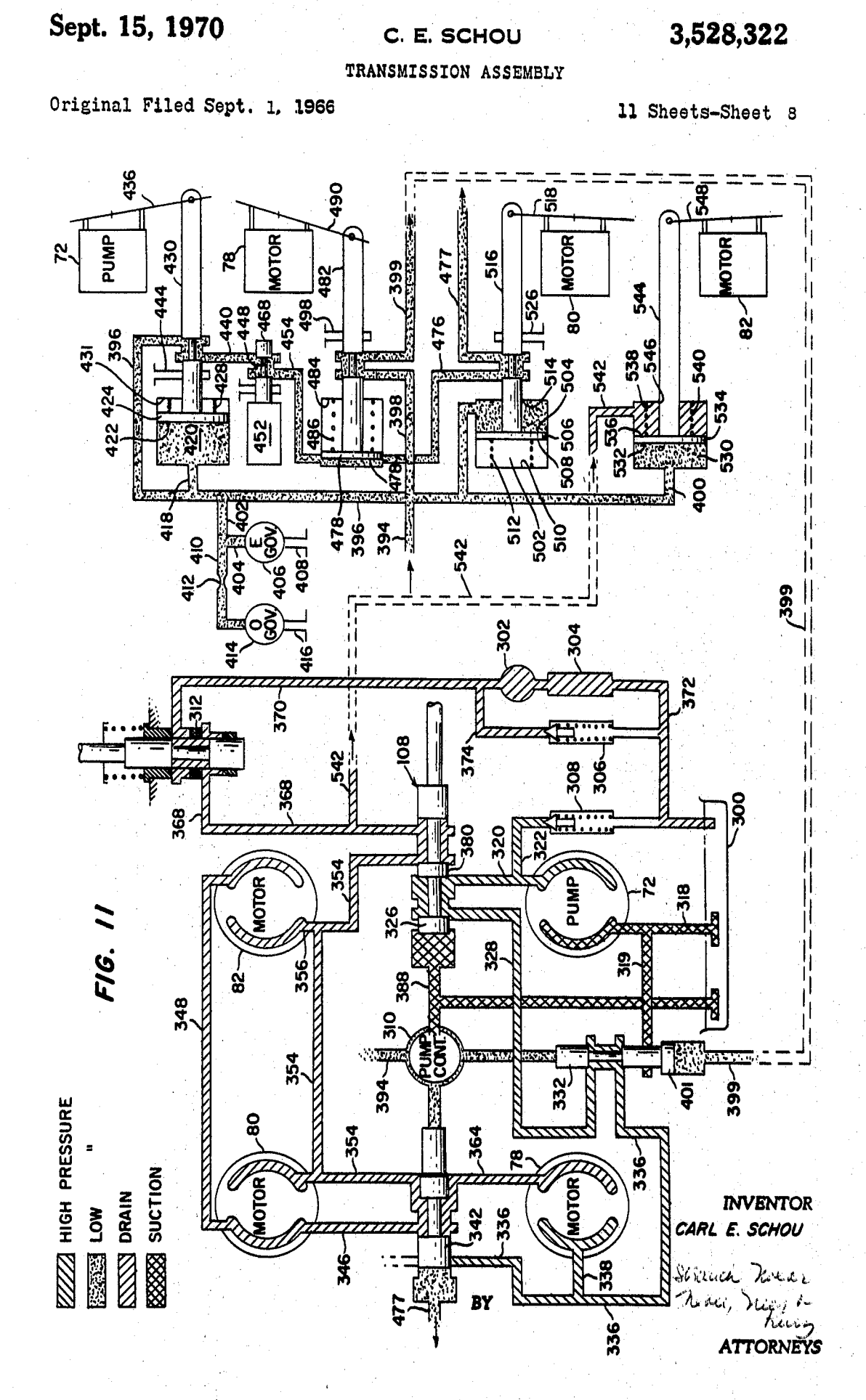

FIGS. 11, 12 and 13 diagrammatically illustrate the high and low pressure circuits for "Forward-Intermediate," "Direct" and "Reverse" drives respectively; and FIG. 14 is a diagrammatic representation of those portions of the high pressure hydrostatic system and of the low pressure control circuitry which constitute the hydrostatic braking system of the present invention.

Similar reference numerals wherever practicable are applied to corresponding parts throughout all figures.

In general the hydomechanical transmission of the present invention is a power dividing or split torque, fully automatic transmission. As is implicit in the term "hydromechanical," the transmission possesses two power flow paths, a mechanical energy path and a hydrostatic energy path. The power delivered by the engine, which may be any one of the conventional diesel or gasoline-driven internal combustion engines available, is split into these two energy paths at the transmission's input shaft by an epicyclic planetary gear train. The transmission's input and output shaft, as will become obvious, are so coupled that a torque output nearly equal to the input torque is always transmitted to the output shaft. This constitutes the mechanical power flow path. A second infinitely variable torque ratio path is provided through the hydrostatic converter system. The two power flow paths are best illustrated in FIG. 1A.

The high pressure hydrostatic torque converter system consists of a single in-line variable displacement piston pump and three parallel connected variable displacement hydraulic motors of the same design and construction as the pump. Variation of the torque output of the hydrostatic system is accomplished by means of a novel low pressure automatic control circuit which hydraulically and sequentially varies the swashplate angles, and hence the torque outputs, of the pump and motors in response to engine speed and output torque demands as sensed by governor units installed about the transmission's input and output shafts. The output of the transmission is so regulated to assure a simple and efficient drive system.

Figure 2:
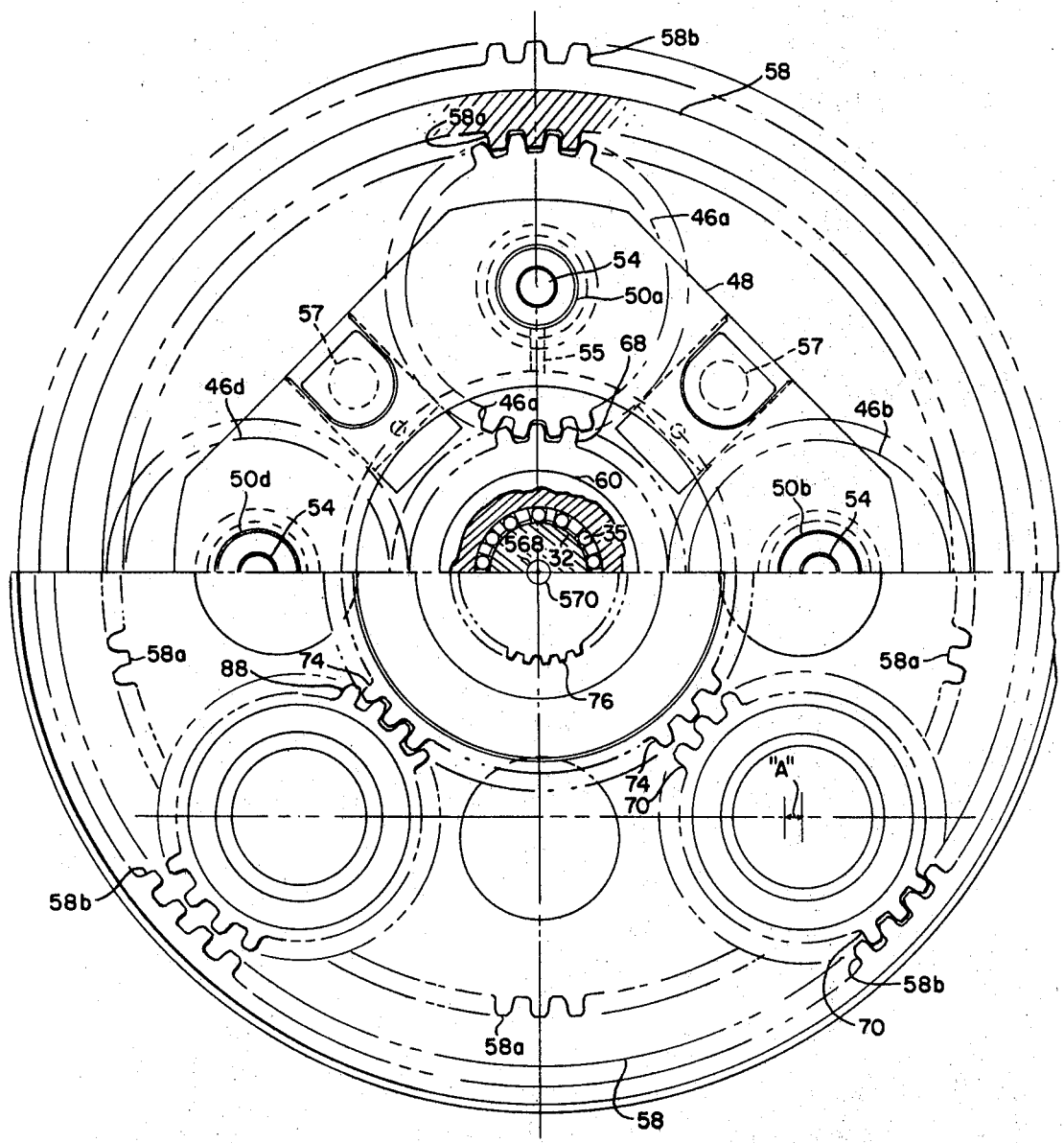
FIG. 2 represents a section taken substantially along line 2—2 of FIG. 1.

Referring specifically now to FIGS. 1 and 2, the transmission unit 10 of the present invention is generally contained within a stationary housing comprising a low pressure pump housing 12, a bell housing 14, a front end plate 16, a main housing casting 18, a wheel cover rear plate 20, and a cover 22. The bottom of the unit is sealed by a sump screen 24 and a removable sump casting 26 having an oil drain plug 28, the two items being secured to the main housing 18 by means of bolts 30. Contained within this compact housing framework, as will be described in detail, is the planetary gear train, the high pressure hydrostatic converter, the low pressure automatic control circuit, and all hydraulic valving and interconnections between these two hydraulic circuits.

Extending to the left from the pump housing 12 is the rotatable input drive shaft 32 of the transmission mounted upon anti-friction bearing means at 34 and 36. The drive connection between the input shaft 32 and the prime mover engine (not shown) is accomplished by means of a conventional splined connection to the engine flywheel and hub assembly 38.

Referring to FIGS. 1 and 1A, the power dividing epicyclic planetary gear train comprises a sun gear 40 integral to the input shaft 32 which engages a set of four planetary pinions 42a, 42b, 42c and 42d which in turn engage a fixed internal ring gear 44. The ring gear 44 is fastened to the inner wall of the front end plate 16 by means of bolts 45. In tandem with the pinion set 42 is a second set of four planetary pinions, 46a, 46b, 46c and 46d. These two planetary pinion sets 42 and 46 are held in this tandem relationship by means of a freely rotating pinion carrier or cage 48 and journal pins 50a, 50b, 50c and 50d, each journal pin being mounted on needle bearings 52 and containing lubricating passages 54, 55 and 56. These passages serve to lubricate the bearings 36 and 52, the input shaft 32 and sun gear 40. The three parts 48a, 48b, and 48c of the pinion cage 48 are secured together by means of a plurality of mounting pins and spacer members 57 (FIG. 2). Bearing 36 interposed between input shaft 32 and cage part 48b journals cage 48.

The planetary pinion set 46 engages ring gear 58 which has two sets of internal gear teeth, 58a and 58b, the pinion set 46 engaging only the ring gear set 58a. The ring gear is supported about the output shaft 60 by a support member 62 (FIG. 1) which is disposed about the periphery of the output shaft 60. Between the support member 62 and output shaft 60 are disposed sleeve anti-friction means 64 and needle bearings 65 which allow the support member 62 and ring gear 58 to rotate relatively free of the output shaft rotation. A snap ring 66 is provided to assure alignment of the ring gear and support member. In addition planetary pinion set 46 also engages the sun gear 68 which is integral with output shaft 60.

Figure 3:
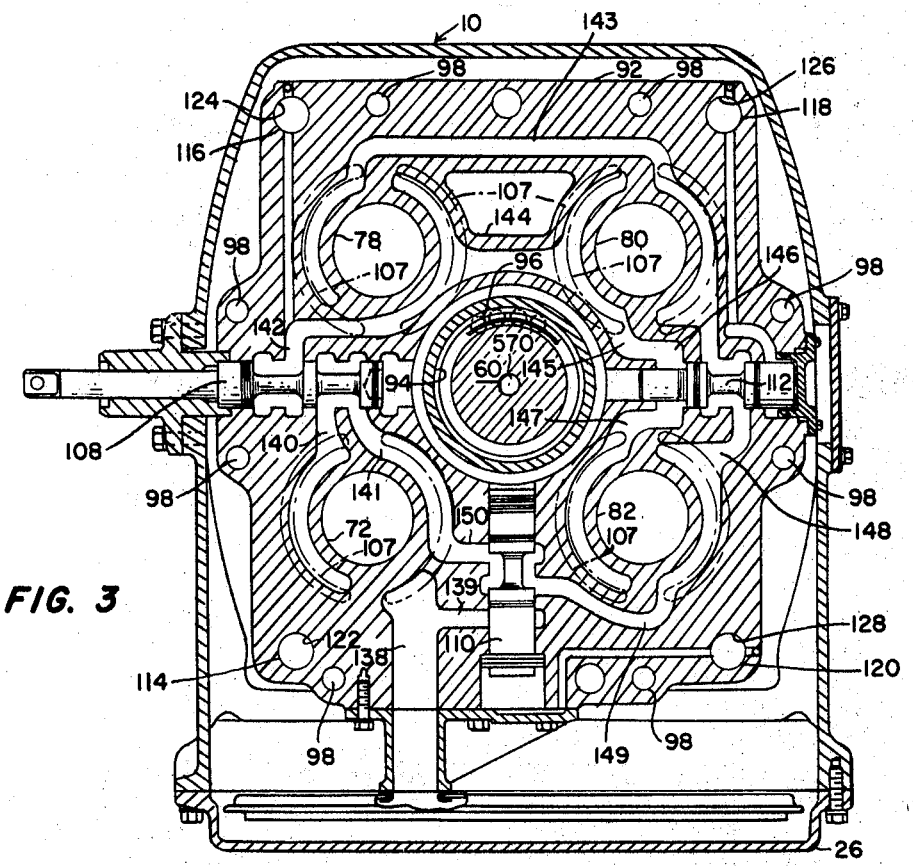
FIG. 3 represents a section taken substantially along line 3—3 of FIG. 1.

Ring gear 58b drives pump gear 70 (FIGS. 1A and 2) and thus provides the mechanical power necessary to drive the high pressure pump 72. As shown in FIG. 2, the pump gear 70 is offset from the output shaft's center gear 74 by the distance "A" and does not engage the center gear 74. The center gear 74 is conventionally connected to the output shaft 60 by means of splines 76 (FIG. 1). Pump 72 in turn converts the mechanical power to hydrostatic energy to drive the three hydraulic motors 78, 80 and 82, of which motors 80 and 82 are shown in FIG. 1. The three motors 78, 80 and 82 and pump 72 are radially disposed about the periphery of the output shaft 60 as is best seen in FIG. 3.

The output of the three hydraulic motors 78, 80 and 82 is converted to rotary mechanical motion and transmitted to the output shaft 60 by means of motor gears 84, 86 and 88 respectively, of which gears 86 and 88 are seen in FIG. 1 and gear 84 in FIG. 2. The three motor gears engage the output center gear 74 to transmit the variable torque output of the three hydraulic motors 78, 80 and 82 to the output shaft 60. As can best be seen in FIGS. 1A and 2, the motor gears 84 and 88, which is typical of any of the three motor gears 84, 86 and 88, unlike pump gear 70, do not engage ring gear 58.

The output torque ratio of the transmission is varied in the hydrostatic converter by varying the swashplate angles of the pump 72 and motors 84, 86 and 88. This will be subsequently described in detail. But from what has been disclosed it is now possible to depict the two aforementioned power flow paths. Referring particularly to FIG. 1A, the first or so-called mechanical torque path which is always present is transmitted through the engine flywheel 38 to the input shaft 32 and its integral sun gear 40 which engages pinion set 42. However, as pinion set 46 is in tandem and coupled with pinion set 42 by means of the carrier 48, the two pinion sets will rotate in unison though at different speeds, the rear pinion set 46 engaging both the ring gear 58 and the sun gear 68 of the output shaft 60, thereby transmitting energy to the output shaft and its driven flange 90 (FIG. 1). Pinion set 46 also engages ring gear teeth at 58a thereby driving the pump gear 70. However, the hydraulic motors are hydraulically connected to or isolated from the pressurized fluid developed by the pump 72 in a manner to be disclosed in detail later. Thus, so long as no torque is delivered from the hydrostatic converter system to the center gear 74 of the output shaft 60, the center gear 74 simply rotates freely at the same speed as the output shaft which is thus solely driven through its sun gear 68. This mechanical power path exists at all times. Various gear reduction ratios to best meet specific design requirements or engine capabilities may be readily accomplished by merely changing the gear ratio of the front end portion of the gear train.

In the so-called hydrostatic power path, the developed engine horsepower undergoes by means of the pump 72 and hydraulic motors 78, 80 and 82 a conversion to hydrostatic energy capable of torque multiplication and variation when it is converted to mechanical energy at the output shaft. This is accomplished by having the input drive shaft 32 transmit the engine's developed power through the tandem pinions 42 and 46 to the ring gear 58, said ring gear set of teeth 58a engaging the pinion set 46 and ring gear set of teeth 58b engaging the pump gear 70. Thus the pump gear 70 drives the hydraulic pump 72 thereby developing pressurized fluid which is transmitted to the three hydraulic motors 78, 80 and 82 which, when in communication with the output of said pump 72 reconvert the hydrostatic energy back to mechanical energy by driving motor gears 84, 86 and 88, all of which mesh with and drive the center gear 74 of output shaft 60 thereby delivering energy to the output shaft's drive flange 90.

An auxiliary power take-off gear 91 is also provided on the periphery of cage part 48b as part of the transmission.

With specific reference now to FIGS. 1 and 3 immediately to the right of the ring gear 58 is a fixed high pressure valve housing member or manifold 92 which is a single casting having a central opening 94 to accommodate both output shaft 60 and its support bearing 96. The advantages of having a single body which completely houses all valving and fluid passages associated with the high pressure hydraulic system are compactness, greater and more uniform strength as wall thicknesses may be regulated to closer tolerances, and the elimination of external interconnecting plumbing. The valve housing 92 is rigidly secured in place by means of a plurality of locating metal pins 98 which are force fitted into mating holes 99 of the valve housing member after the valve housing member has been placed in abutment and aligned against a plurality of internally projecting ribs 100 integral to the main housing 18.

Figure 4:
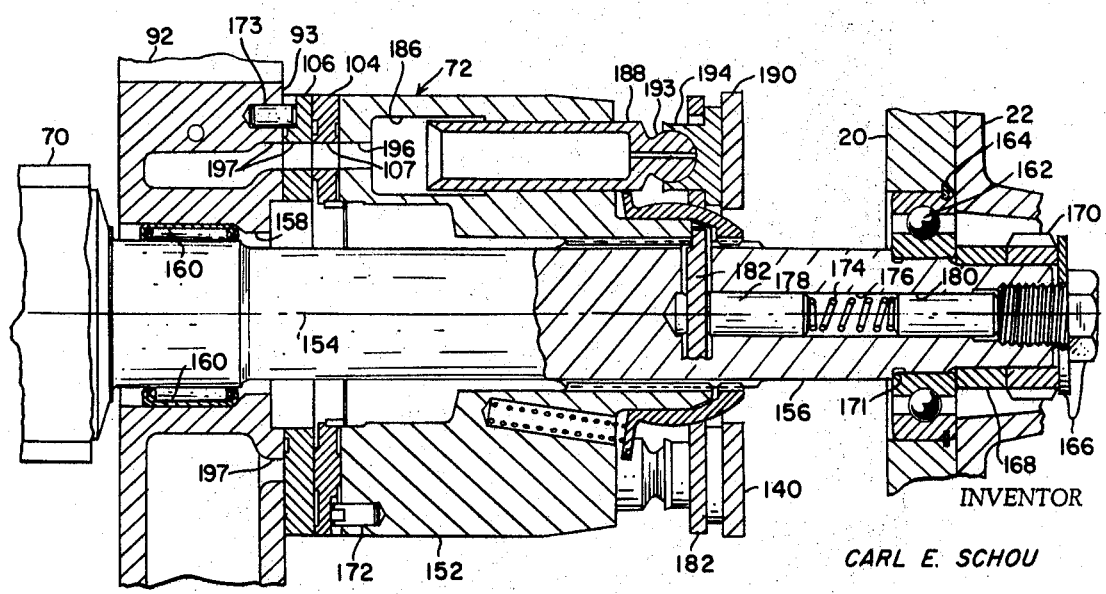
FIG. 4 is a longitudinal sectional view of a swashplate regulated variable displacement pump or motor.

The hydraulic high pressure pump 72 and motors 78, 80 and 82 are all of like construction, are each supported by housing 92 and plate 20 upon anti-friction means 160 and 162 (see FIG. 4) and are placed in abutment against the valve housing member 92 with two cast iron wafer plates 104 and 106 being inserted between the valve housing 92 and the respective pump or motors. The flat abutting surfaces of the wafer plates 104 and 106 are machined to produce extremely smooth surfaces so as to minimize wear as the various hydraulic components rotate against these surfaces. The purpose of these plates 104 and 106 is to provide wear surfaces on the housing 92 and pump or motor which are readily replaced and which are inexpensive rather than having the pump and motors rotate directly against the valve housing surfaces. Leakage between the wafer plates 104, 106, valve housing 92, and pump or motors is minimal. Referring to FIGS. 3 and 4, kidney-shaped openings 107 in the wafer plate 104 and 106 and in the right valve housing wall are radially aligned with similarly shaped openings in the pump and motor bodies to allow for free flow of oil to and from the valve housing member 92 to the pump and motors. These openings are shown in phantom at 107 in FIG. 3. This structural arrangement eliminates the need for plumbing, external of the valve housing 92 and eliminates typical plumbing failures associated with high pressure hydrostatic converters.

A tube 91 surrounding output shaft 60 is fixed at one end to housing member 42 and at its other end within the rear housing wall as shown in FIG. 1.

Figure 6:
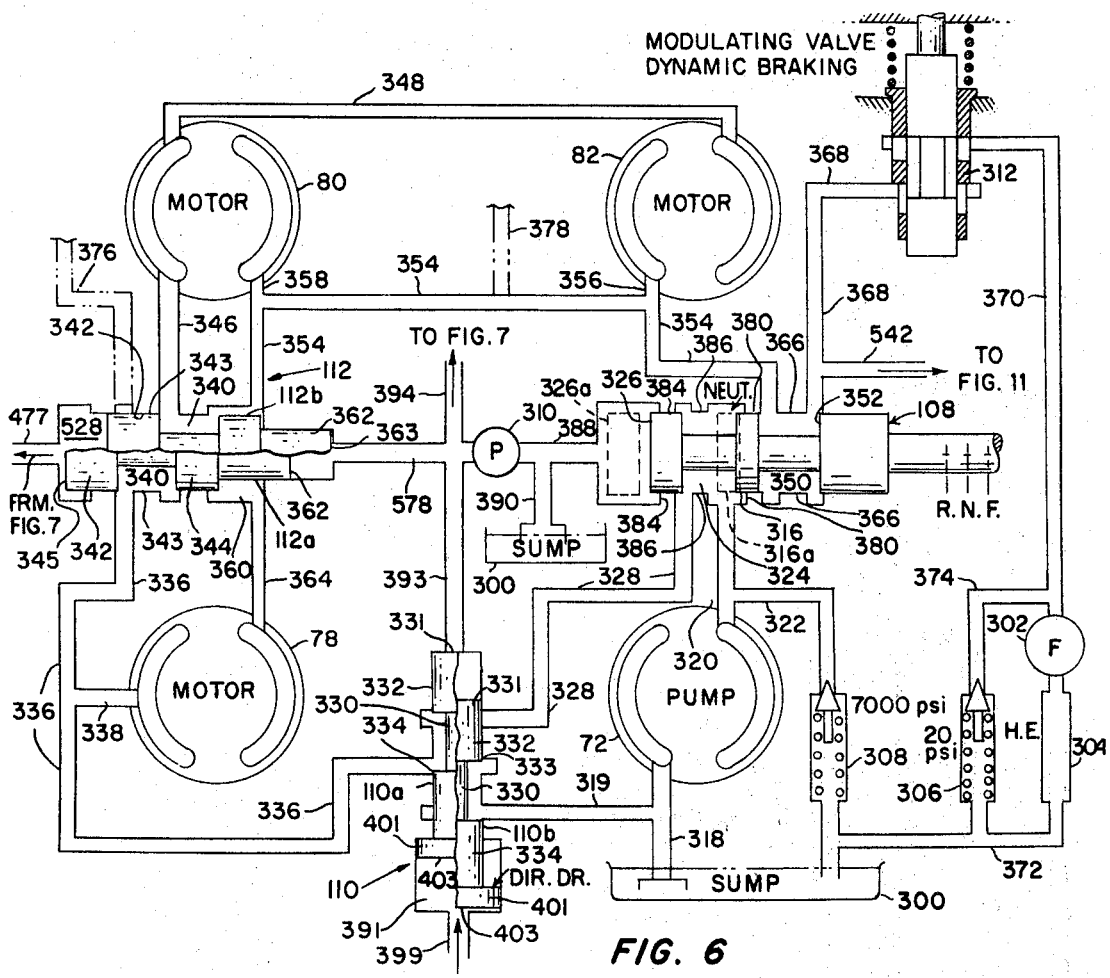
FIG. 6 is a diagrammatic representation of the high pressure hydrostatic converter system of the present invention.

With particular reference to FIG. 3, there is equiangularly disposed about the axis of the output shaft 60 at 90° intervals the high pressure pump 72 and the three hydraulic motors 78, 80 and 82. Also disposed about the periphery of the output shaft, and wholly contained within the valve housing member 92 are the three valves needed to regulate and operate the high pressure system, namely, the manually operable directional control valve 108, motor cutout valve 110, and motor cutout valve 112. The motor cutout valves are controlled and operated automatically by the low pressure control system (FIG. 7) and will be subsequently discussed in detail. Also disposed at 90° intervals about the axis of the output shaft 60 in the extreme corners of the valve housing member 92 are four bores 114, 116, 118 and 120 through which pass stroking rods 122, 124, 126 and 128 (identified by the numeral 202 in FIG. 5) which are mechanically linked to the swashplates 130, 132, 134 and 136 (identified by the numeral 190 in FIGS. 4 and 5) of the pump and motors of the high pressure system as best seen in part in FIG. 1. The function of these stroking rods 122, 124, 126 and 128 will be discussed in detail later in conjunction with FIGS. 5, 6 and 7. Passageways 138 through 150 (FIG. 3) are several of the channels interconnecting the components of the high pressure system (FIG. 6). A detailed discussion of the circuitry comprised in part by these passageways will be given presently in conjunction with the schematic of FIG. 6.

FIG. 4 is a cross-sectional view of the high pressure pump 72 such as is disclosed by U.S. Pat. No. 3,230,893 adapted for use in the present invention. Note that as the pump 72 and motors 78, 80 and 82 are essentially alike and that the following description is typical of either unit.

The pump 72 comprises a casing or cylinder block 152 through which is extended along its longitudinal axis 154 a rotating drive shaft 156. The drive shaft extends outwardly to the left from the casing into an opening 158 in valve housing member 92 where it is mounted on rollers 160. At the opposite end the drive shaft is supported in plate 20 on bearings 162 held in place by retaining ring 164. The drive shaft 156 is axially fixed relative to the rear plate 20 by means of washer and bolt assembly 166 which acts through spacer ring 168 and speedometer gear 170 to confine the inner race of bearing 162 against shoulder 171 of shaft 156.

Integral with the left end of the drive shaft 156 is pump gear 70. Inserted between the casing 152 and the valve housing member 92 are the earlier mentioned metal wafer plates 104 and 106 which are secured in place respectively to cylinder block 152 and housing 92 by means of locating pins 172 and 173. Spring 174 located within chamber 176 of drive shaft 156 and disposed between pins 178 and 180 acts upon pin 178 urging it to the left thereby placing thrustplate 182 which is secured to pin 178 into abuttnig contact with rotating cylinder block 152. Consequently cylinder block 152 which is in abutment with wafer plate 104 resiliently urges the wafer plates 104 and 106 and plate 106 and surface 93 of the valve housing 92 into abutting contact to minimize oil leakage between these surfaces at low rotary unit speeds. At high speeds forces developed within a plurality of cylinder bores, such as bore 186, equally spaced around the cylinder blocks axis will further urge these surfaces into abutting contact.

Each cylinder bore 186 axially slidably receives a reciprocating piston 188 one end of which extends outwardly through the open end of the cylinder bore where it is universally pivotally connected to the swashplate assembly 190 by the outer end of the piston in the shape of a ball 192 seated in an individual mated socket of a bearing shoe 194 and suitably retained against thrustplate 182.

The swashplate assembly 190 is mounted for pivotal movement about a fixed horizontal axis transverse and normal to the drive shaft axis 154 in substantially the manner illustrated in said Pat. 3,230,893. By regulating the degree of pivotal movement of the swashplate 190 from its neutral position which is normal to the drive shaft axis the length of the stroke of pistons 188, and hence the pumping rate or volumetric capacity of the pump 72 may be regulated and varied. As cylinder block 152 rotates, pistons 188 follow the inclination of the swashplate assembly 190 and reciprocate in their respective cylinders 186 thereby providing the pumping action as follows: as each cylinder port 196 and the associated similar port 107 in the wafer 104 moves across the kidney-shaped opening 197 in the wafer plate 106 and housing 92 hydraulic fluid is drawn through the inlet openings from the fluid reservoir as pistons 188 stroke to the right creating a vacuum within the cylinder bores 186. As the cylinder block 152 continues to rotate the bores 186 are placed in communication with the outlet openings in the wafer plate 106 and valve housing member 92 at which time the pistons are urged inwardly within their cylinder bores thereby discharging the hydraulic fluid under pressure.

Maximum clockwise inclination of the motor or pump swashplate assembly about its fixed axis for the present invention is 18°, minimum inclination or angular displacement is near 0°. These displacement values are dependent upon the type pump or motor selected and may vary dependent upon the type unit selected. Rotary speed of the pump is dependent on engine speed and the speed reduction ratio of the aforementioned planetary gear train; motor rotary speed is dependent primarily on output torque demands. While the theoretical minimum swashplate angle for the motor units is 0°, the true minimum angle will be some angle tending to approach 0°, possibly about 1° to 4° dependent on what value will be required to maintain lubrication after each motor has been disstroked. Since the actual minimum angle is unknown, for description purposes herein it is described as "0°," it being understood that it is in fact some value closely approaching 0°, not exactly 0°.

Hydraulic forces act upon the swashplate assembly 190 of pump 72 during the pumping operation. These internally developed forces which are here denominated as yoke forces or moments inherently tend to urge the swashplate assembly 190 of the pump towards a minimum angular displacement of zero degrees during operation with varying degrees of magnitude as these forces are dependent on pressure within the high pressure hydrostatic system and on the rotary speed of the unit. In the motors these inherent operational forces tend to urge the swashplate assembly towards its maximum displacement of 18°. As will be considered in detail subsequently with reference to FIG. 7 these yoke forces at the various swashplate assemblies of the pump and motors (there indicated by the numerals 436, 490, 518 and 548) play an important role in the automatic operation of the low pressure control system.

As herein disclosed all three of the motors 78, 80 and 82 are of the same size.

For specific applications, however, due to efficiency considerations it may be desirable to have the three motors of different sizes, that is of different volumetric capacities.

Figure 5:
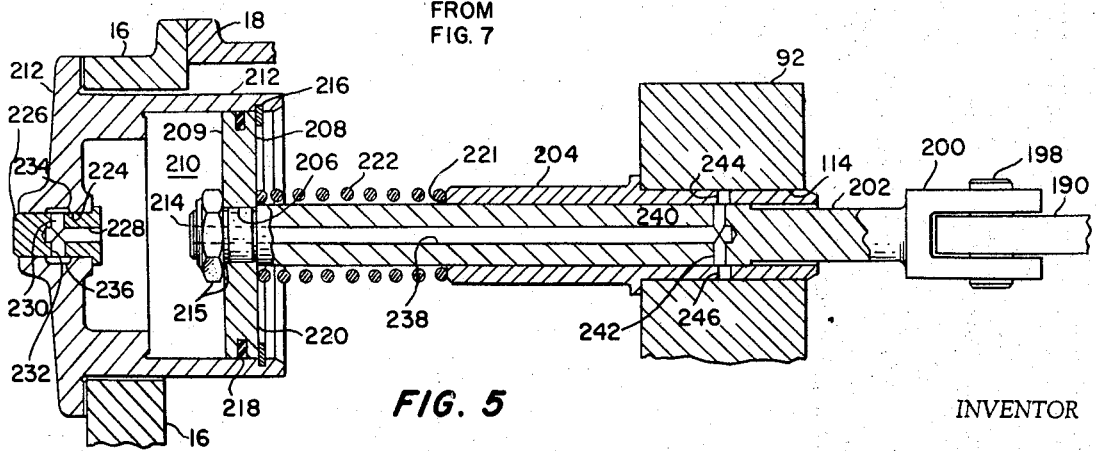
FIG. 5 is a longitudinal sectional view of a control piston and piston stroking rod utilized to regulate the angular displacement of a swashplate of a hydraulic pump or motor.

With particular reference to FIG. 5, the swashplate assembly 190 of each hydraulic pump or motors utilized in the present transmission is connected by means of trunnion 198 to the yoke 200 of a piston stroking rod 202 (identified by the numerals 122, 124, 126 and 128 in FIG. 3). Such a stroking rod encased partially by a metal sleeve 204 passes through each of the four bores 114, 116, 118 and 120 of valve housing member 92. The stroking rod is freely slidable within this sleeve 204. The stroking rod 202 also passes through a central opening 206 in piston plate 208 into chamber 210 of piston cylinder 212 where a threaded portion 214 of the stroking rod is secured to the piston plate by means of a nut and washer assembly 215. The outward movement of the piston plate 208 (to the right in FIG. 5) which is slidable within the piston cylinder 212 in turn is limited by means of retaining snap ring 216. A seal 218 is provided to minimize fluid leakage from the piston cylinder. Compressed between the exterior face 220 of metal plate 208 and the end face 221 of sleeve 204 in surrounding relation to rod 202 is a helical compression spring 222 which normally biases the piston plate 208 and rod 202 to the left as viewed in FIG. 5.

Inserted within a central opening 224 in cylinder 212 is a metal plug 226. The metal plug 226 contains a central horizontal blind passageway 228 and two interconnected vertical passageways 230 and 232 which are in communication with channels 234 and 236 connected to the passage 562 within the main housing casting 16 (see FIG. 1). These passages and channels form part of the low pressure control system which will be discussed in detail subsequently. For now it is sufficient to state that the main function of these passages and channels is to route low pressure control fluid into chamber 210 where the fluid acts upon the pressure face 209 of piston plate 208 developing a force that acts in opposition to the aforementioned inherent yoke forces acting upon the swashplate assembly 190. The balancing of these forces thus determines the angular displacement of the swashplate 190 at any given time.

The piston stroking rod 202 also contains an axial passageway 238 which interconnects with radial passageways 240 and 242 also contained within the stroking rod. Sleeve 204 similarly has two radial passageways 244 and 246 which are in communications with channels (not shown) in the valve housing member 92. When the vertical passages of the stroking rod and sleeve are aligned, they form an exhaust path for the pressurized fluid contained in chamber 210 to other sections of the control circuitry as will be explained presently in reference to FIG. 7, where, for example, the axial passage 238 for the pump swashplate actuator is indicated diagrammatically at 418. The positioning of the stroking rod vertical passages 240 and 242 relative to the sleeve passages 244 and 246 is dependent upon the pressure of the fluid within the piston cylinder acting upon piston plate 208 and the balancing effect it has upon the inherent yoke forces acting upon the swashplate assembly 190.

Except for slight modification the above described piston and stroking rod assembly is typical for each of the motors 78, 80 and 82 and the pump 72 of the hydrostatic converter system.

THE HYDROSTATIC "HIGH PRESSURE CIRCUIT"

With particular reference to FIG. 6 which depicts the high pressure circuit of the present invention in schematic form, the basic high pressure hydrostatic circuit consists of the aforementioned single mechanically driven in-line variable displacement pump 72 supplying fluid under pressure to three variable displacement hydraulic motors 78, 80 and 82 from a hydraulic fluid reservoir or sump 300. The return fluid exhausted from these three motors is routed, except when the vehicle is in reverse drive, to pass through filter 302 and heat exchanger 304 where it is respectively cleansed of harmful contaminants which would retard exhaust oil flow which is normally at atmospheric pressure, and then cooled before return to sump 300. A high pressure check valve 308 is connected in parallel across the pump 72 to protect the operator and equipment from dangerous pressure buildups. The normal high pressure operating range will be between 7000 p.s.i. to 4000 p.s.i. A gerotor type gear pump 310 is provided to develop a low pressure of approximately 200 p.s.i. for operational use within the automatic control circuit, depicted in FIG. 7, which will be hereinafter described. For the present we will only be concerned with the high pressure circuit of FIG. 6.

The high pressure circuit is also comprised to two motor cutout valves 110 and 112. Valve 112 controls motors 80 and 82, valve 110 controls motor 78. These valves 110 and 112 have only two operating positions as indicated by the designations $a$ and $b$. The "$a$" designation for cutout valve 112 denotes the positioning of the valve when the motors 80 and 82 are connected to pump 72 and part of the active hydrostatic converter system. The "$b$" designation denotes the position of the valve when the motors 80 and 82 have been hydraulically cutoff from pump 72 and thereby deactivated in response to reductions in the torque ratio demands made upon the system. Similarly the "$a$" designation as applied to cutout valve 110 indicates the positioning of the valve when motor 78 is connected to pump 72 and part of the active hydrostatic converter system; and the "$b$" designation indicates the position of the valve when it cuts motor 78 off from pump 72 and hydraulically deactivates motor 78 in response to further reductions in the torque ratio demands made upon the system. These two valves are regulated by the low pressure control circuit of FIG. 7 to deactivate hydraulically the three variable motors 78, 80 and 82, valve 110 being used to deactivate motor 78 and valve 112 being used to deactivate motors 80 and 82. This will be considered in detail hereinafter in conjunction with FIG. 7.

Directional control valve 108 is a slidable manually operated valve which provides the transmission with a forward drive position, a reverse drive position, and a neutral setting. Dynamic hydraulic braking is accomplished by brake valve 312 which is of the type disclosed in my co-pending U.S. patent application No. 422,652, filed December 31, 1964 for "Hydrostatic Transimission," now U.S. Letters Patent No. 3,303,901 issued Feb. 14, 1967.

NEUTRAL (FIG. 6)

The power or high pressure flow circuit of Figure 6 will now be considered. Assuming initially that the directional control valve 108 has been placed in the neutral setting, that is where valve spool 316 has been shifted to the neutral position as generally indicated by the phantom lines of 316a. With the vehicle engine turned on and pump 72 in a pumping condition under the control of its swashplate, oil will be drawn up from the sump 300 through channel 318 by the pump 72 and discharged under pressure into channel 320. Branching off from channel 320 is a bypass channel 322 which contains the high pressure relief valve 308 and provides a direct flow path back to the sump 300.

Oil flow is also directed by channel 320 into a slidable valve chamber 324 of directional control valve 108 which exists between valve spools 316 and 326. In chamber 324, oil flow is divided by valve spool 316 positioned at 316a into two oil flow paths. In the "first" path, fluid flow is directed from valve chamber 324 into channel 328 which is in communication with a slidable valve chamber 330 which exists between valve spools 332 and 334 of motor cutout valve 110 (which is as positioned at 110a except when the transmission is in direct mechanical drive). From valve chamber 330 fluid flow is directed through channel 336 by means of a spur channel 338 to variable motor 78 and to slidable valve chamber 340, which exists between valve spools 342 and 344 of motor cutout valve 112 (which is positioned at 112a except when the transmission is in direct or intermediate forward drive). From valve chamber 340, the fluid flow continues through channel 346 to motor 80 and from motor 80 to motor 82 through channel 348. Note that this "first" flow path just described connects the three motors 78, 80 and 82 in parallel connection to the outlet of pump 72. Thus the same pressure as developed at the output or pressure side of the pump 72 in channel 320 is made available at each of the motors through this particular "first" path.

In the "second" fluid flow path, a portion of the fluid flow is diverted about valve spool 316 positioned as shown at 316a into valve chamber 350, which exists between valve spools 316 and 352, and from chamber 350 into channel 354 which directs fluid to motor 82 through spur channel 356 and to motor 80 through spur channel 358; and to chamber 360 which exists between valve spool 362 and valve spool 344 of cutout valve 112 as positioned at 112a, which directs the fluid into channel 364 which terminates at motor 78. As with the "first" flow path, the "second" flow path connects the three motors 78, 80 and 82 in parallel to the output of pressure side of pump 72. Thus, in neutral, fluid at the same pressure is provided through these two flow paths to both sides of the motors. Under this condition there is no pressure differential across the motors, and the effect of this condition is to lock hydraulically the three motors 78, 80 and 82 into neutral or no-load stationary position. Consequently, while the pump 72, due to its mechanical connection through the planetary gear train to the engine, will operate to develop pressure within the circuit, no output driving torque is developed by the three hydraulic motors 78, 80 and 82.

As will be explained presently, while the engine is idling, the swashplate of pump 72 is adjusted for minimum output of the pump. Dangerous pressure buildups are prevented in neutral should the vehicle operator race the engine and hence the pump due to the mechanical linkage through the gear train to the pump gear 70 and the engine flywheel, by providing a drain or "exhaust" path from valve chamber 350 direct to the sump 300. This "exhaust" path is as follows: with valve 108 in its neutral position, valve spool 352, though shifted to the left towards valve seat 366, does not engage the valve seat. A sufficient opening exists between valve seat 366 and the left vertical face of spool 352 whereby fluid is allowed to drain from valve chamber 350 into channel 368, on through brake valve 312 to channel 370 which terminates at filter 302. From the filter 302, fluid is directed through the heat exchanger 304 to channel 372 which is in communication with the sump 300. Spur channel 374 directs fluid flow to the low pressure relief valve 306 as earlier described.

Channels 376 and 378 may be provided to operate auxiliary equipment.

FORWARD DRIVE (FIG. 6)

With the directional control valve set in a forward drive setting, valve 108 assumes the position indicated in FIG. 6 by the solid lines. Of significance for this condition is the movement of valve spool 316 from position 316a to the position indicated where it engages valve seat 380. The movement of valve spool 352 in the shifting operation only serves to further open the aforementioned opening between the edge of spool 352 and valve seat 366 which places channel 368 and the "exhaust" path in full communication with valve chamber 350; and the movement of valve spool 326 is of no significance at this time as the valve spool continues to engage valve seat 384 as it did when in neutral. Thus fluid flow from the high pressure side of the pump will take the path described earlier as the "first" path with the "second" path closed off from the high pressure side of the pump by the engagement of valve spool 316 against valve seat 380. Motor 78 will exhaust through channel 364 and through chamber 360 of cutout valve 112 to channel 354; and motor 80 will exhaust through channel 358 to channel 354; and motor 82 will exhaust through channel 356 to channel 354. From channel 354 exhaust flow will be directed through valve chamber 350 of the directional control valve 108 to channel 368 where it will flow through the aforementioned "exhaust" path to the sump 300.

REVERSE DRIVE (FIGS. 6 AND 13)

Shifting the directional control valve 108 to the reverse setting causes valve spool 352 to engage valve seat 366 thereby sealing off channel 368 from slidable chamber 350; and valve spool 316 is shifted to the left where it engages valve seat 386; and valve spool 326 is shifted to the left to position 326a in such a manner that slidable valve chamber 324 is placed in communication with the sump 300 through channels 388 and 390. Thus fluid flow from the high pressure side of the pump will flow through channel 320 into valve chamber 350 where it will flow into channel 354 and follow the earlier described "second" path with the high pressure flow to the "first" path sealed off by engagement of valve spool 316 against valve seat 386. Motor 82 will exhaust into channel 348 which in turn joins the exhaust flow of motor 80 into channel 346 which terminates in valve chamber 340 of cutout valve 112. From valve chamber 340 this exhaust flow is directed into channel 336 where it is joined by the exhaust flow of motor 78 through channel 338. Channel 336 thus directs the exhaust flow of all three hydraulic motors into valve chamber 330 of cutout valve 110a from where the flow is directed through channel 328 into valve chamber 324, which as earlier described is in communication with the sump 300 through channels 388 and 390.

THE AUTOMATIC CONTROL SYSTEM

Thus far fluid flow in the high pressure circuit has been concerned with high pressure flow to all three hydraulic motors, but as earlier noted this is only one of the operating conditions of the transmissions. The present invention, for purposes of system efficiency, provides a means of automatically and sequentially cutting the motors out of the active high pressure circuit in response to engine speed and torque demands on the transmission. However, before considering this function of the circuit it will be necessary to consider the low pressure automatic control circuit in detail.

The operation of the hydraulic high pressure circuit of the transmission described with reference to FIGS. 1 through 6 is automatically controlled by means of a low pressure control circuit such as is shown in FIG. 7. This low pressure control circuit comprises a gerotor pump 310 which is generally of the form illustrated in U.S. Pats. No. 1,682,563, dated Aug. 28, 1928 to Hill for "Internal Rotor" and No. 2,091,317, dated Aug. 31, 1937 to Hill for "Gear Tooth Curve" and which will be subsequently described in detail in reference to FIG. 8. Pump 310 draws oil from the sump 300 through channel 390 and expels it under pressure into channel 394 which is in communication with channels 396, 398 and 400.

The fluid under pressure passing through channel 396 is routed, in part, through: channel 402 and spur channel 404 to an engine governor 406, the output of which is redirected back to the sump through channel 408, and channel 410 which contains a restrictor pin 412 to an output governor 414, the output of which is also channeled to the sump through channel 416. The two governor units, which operate functionally as centrifugally operated bleeder valves, and the restrictor pin's construction and function will be described hereinafter.

SWASHPLATE ACTUATOR—PUMP 72

Continuing upwards from the juncture of channels 394 and 396, a portion of the fluid under pressure in channel 396 is directed through spur channel 418 to piston chamber 420 of the pump swashplate actuator where said fluid acts upon the face 422 of piston 424. Piston 424 is normally biased to the left by a compressed coil spring 428 disposed about piston stroking rod 430 between the non-pressure face 426 of piston 424 and the extreme right wall 431 of chamber 420. This piston cylinder and stroking rod assembly schematically illustrated here is of the type described earlier in conjunction with FIG. 5 the corresponding parts being springs 428 and 222, faces 208 and 426 and faces 221 and 431. The function of the piston coil spring 428 is to assure the return of the pump swashplate to a disstroked position when the vehicle is turned off, that is to approach a zero degree angular displacement setting. The magnitude of the force developed by the spring 428 is slight and plays no material role in the operation of the system other than to perform this limited function.

The piston stroking rod 430, integral with piston 424, extends through a central opening 434 in the extreme right wall 431 of the piston chamber and is mechanically linked to the swashplate 436 of the variable displacement pump 72. The piston stroking rod 430 is shown as having a reduced diameter portion 432 which is longitudinally disposed within an annular valve chamber 438, and that channel 396 terminates in valve chamber 438. This reduced section 432 of the piston stroking is a diagrammatic representation of the internal passageways 238, 240, 242, 244 and 246 earlier described in conjunction with FIG. 5.

As will be explained later in detail, the interaction of the forces developed by the pressurized fluid in piston chamber 420 acting to the right upon piston face 422 and the yoke forces developed by the rotary motion of pump 72, which tend to urge the pump swashplate 436 clockwise to a minimum angular displacement, is what regulates and determines the disposition of the reduced portion 432 of the piston stroking rod within an annular valve chamber 438. Thus depending on the magnitude of these aforementioned forces, the swashplate of the pump 72 may be at its maximum displacement of 18° at which time the reduced portion 432 of piston rod 430 is positioned as shown by the section lined area in FIG. 7 such that the oil is free to flow from channel 396 into valve chamber 438 and on out to channel 440; or the swashplate 436 may be at its minimum displacement of 0° at which time the reduced portion 432 of stroking rod 430 is positioned as shown at 432a in phantom lines where flow from 396 into valve chamber 438 is fully cutoff as a wider section of the piston rod is placed into engagement against valve seat 442 and channel 440 is placed in communication with the sump through channel 444; or the swashplate may be positioned at any one of the intermediate positions between these aforementioned extremes whereby flow from channel 396 into channel 440 from valve chamber 438 is restricted in varying degrees. The length of the piston chamber 430 can be used to determine the swashplate's angular displacement range as the mechanical linkage of the piston stroking rod 430 to the swashplate 436 limits the movement of the swashplate to the longitudinal displacement of the piston and piston rod within chamber 420.

SOLENOID VALVE 452

From valve chamber 438 fluid flow is directed to channel 440 which is in communication with valve chamber 446. Disposed within annular valve chamber 446 is the reduced diameter portion 448 of the plunger rod 450 of solenoid valve 452. In its normal or de-energized state, the plunger rod assumes the position indicated by the solid lines in FIG. 7 whereby fluid flows unrestricted from channel 440 through valve chamber 446 and out to channel 454. When solenoid valve 452 is activated by full depression of the accelerator pedal 464 to close switch 456, plunger rod 450 is urged to the left such that the enlarged tail end 468 of the rod as indicated by the phantom lines at 468a engages valve seat 470 shutting off fluid flow into valve chamber 446, and the reduced portion 448 is displaced to the left placing channel 454 in communication with the sump through channel 472. The functional operation of the solenoid valve will be considered subsequently in detail. For the present it will suffice to understand that solenoid valve 452 is normally de-energized and is energized to down shift the transmission only upon full depression of the acceleration pedal 464.

SWASHPLATE ACTUATOR—MOTOR 78

Flow from valve chamber 446 is directed to channel 454 which is in communication with piston chamber 474 of the swashplaate actuator of the type discussed in FIG. 5 for the motor 78. From chamber 474 fluid passes to channel 476. The pressurized fluid in piston chamber 474 acts upon the face 478 of piston 480 which is disposed within chamber 474 urging the piston to the right. Disposed about piston stroking rod 482, which is integral with piston 480, between the non-pressure face 481 of piston 480 and the extreme right wall 484 of chamber 474, is a partially compressed coil spring 486 which normally biases piston 482 to the left. The piston rod extends through a central opening 488 in the right wall of piston chamber 474 and is mechanically linked to the swashplate 490 of variable motor 78. The length of piston rod 482 has a reduced diameter portion 492 longitudinally disposed within an annular valve chamber 494. The interaction of forces developed by the pressurized fluid acting upon the face 478 of piston 480, which urges the piston to the right and the inherent yoke forces developed by the rotary motion of motor 78 which tend to urge swashplate 490 to pivot in a clockwise direction towards its maximum angular displacement, regulates and determines the disposition of the reduced portion 492 of piston rod 482 within valve chamber 494. Thus, depending on the magnitude of these aforementioned forces, the swashplate 490 may be positioned at its maximum displacement of 18° at which time the reduced portion 492 of the piston rod is positioned as shown in FIG. 7 by the section lined area such that oil is free to flow from channel 398 through and out of valve chamber 494 into channel 399; or the swashplate may be positioned at its minimum angular displacement of 0° as shown by the phantom lines at which the reduced section of the piston rod is at 492a and the wider section of the piston rod has moved into engagement with valve seat 496 thereby fully cutting off fluid flow from channel 398 to channel 399 and placing channel 399 in communication with the sump through valve chamber 494 and channel 498; or the swashplate 490 may be positioned at any one of the intermediate positions between these two extremes whereby flow into channel 399 from channel 398 is restricted in varying degrees. As can best be seen in FIG. 6 channel 399 terminates in valve chamber 391 of cutout valve 110.

SWASHPLATE ACTUATOR—MOTOR 80

Referring again to FIG. 7, moving downward now along channel 400 from the juncture of channels 394 through 400, spur channel 500 in communication with piston chamber 502 for the swashplate actuator for motor 80 directs fluid against the face 504 of piston 506 where said pressurized fluid acts to urge the piston to the left. Disposed within piston chamber 502 between the non-pressure face 508 of piston 506 and the extreme right wall 510 of chamber 502 is a partially compressed coil 512 which normally biases piston 508 to the right. Integral with piston 508 and extending from the valve chamber 502 through a central opening 514 in the extreme right wall 510 of chamber 502 is the piston stroking rod 516 of the type illustrated in FIG. 5 which is mechanically linked to the swashplate 518 of variable motor 80. As already noted the yoke forces developed at the swashplate of a hydraulic variable motor tend to urge the swashplate to assume a maximum angular displacement, in this instance in a counterclockwise direction due to the physical placement of motor 80 within the main housing member. Thus depending upon the magnitude of these forces the swashplate 518 may be positioned at its maximum displacement of 18° such that the reduced diameter portion 520 of the piston rod may be positioned as shown by the section lines in FIG. 7 whereby piston rod 516 is positioned against valve seat 522 completely shutting off fluid flow from channel 476 through annular valve chamber 524 to channel 477 and placing channel 477 in communication with the sump through channel 526; or the swashplate may be positioned at its minimum displacement of 0° at which time the reduced portion of the piston rod is positioned to place channel 476 in communication, through valve chamber 524, with channel 477 as shown by the phantom lines whereby the reduced portion of the piston is positioned at 520a and the enlarged portion of piston rod 516 to the left at its reduced section engages valve seat 523; or the swashplate 518 may be positioned at any one of the intermediate positions between these extremes. As can best be seen in FIG. 6, channel 477 terminates in valve chamber 528 of cutoff valve 112.

SWASHPLATE ACTUATOR—MOTOR 82

Moving further downwardly along channel 400, it can be seen that channel 400 terminates in piston chamber 530 (such as is part of the piston assembly illustrated in FIG. 5) where the pressurized fluid transmitted through channel 400 acts upon face 532 of piston 534 urging the piston to the right. Disposed between the reverse face 536 of piston 534 and the extreme right wall 538 of piston chamber 530 is a partially compressed coil spring 540 which tends normally to bias piston 534 to the left. Channel 542 also transmits fluid under pressure into piston chamber 530 where it acts upon the reverse face 536 of piston 534 urging the piston to the left; however, note that the pressurized fluid transmitted by channel 542 into piston chamber 530 is delivered only during braking of the vehicle through the hydrostatic braking system. This will be considered in detail subsequently.

Integral with piston 534 is piston stroking rod 544 which extends through a central opening 546 in wall 538 of chamber 530 where it is mechanically linked to the swashplate 548 of variable motor 82. As previously noted, the inherent yoke forces acting upon the swashplate tend to urge the swashplate to a maximum angular displacement of 18°. Thus the swashplate's angular displacement at any given time will be a function of fluid pressure acting upon the face 532 of piston 534 as balanced by the normal spring bias force, the yoke forces at the swashplate, and during braking operations the force developed on the reverse face 536 of piston 534.

SEQUENTIAL MOTOR PHASE-OUT

As earlier noted the hydraulic variable motors will be sequentially phased out of the active hydrostatic circuit in accordance with the particular torque demand made upon the system. This is made possible by providing different size internal diameter control piston chambers for each hydraulic motor. For illustrative purposes only, the following internal diameter sizes have been assigned to the three piston chambers; chamber 474 has a 3.00 inch diameter; chamber 502 has a 3.40 inch diameter; and chamber 530 has a 3.50 inch diameter. Thus while the gerotor pump 310 supplies fluid at the same pressure to each of the three control pistons, the forces developed at each piston pressure face varies as the pressurized fluid acts upon different sized piston areas. And though all motors rotate at the same speed and are subjected to the same system high pressure, the angular displacement of the swashplates at each motor will be different from the others as the respective control piston forces which are in opposition to the yoke forces will vary at each motor due to the aforementioned difference in control piston areas. Consequently as fluid pressure in the low pressure control system increases as engine speed increases, the gerotor pump output being a function of engine speed, the forces developed by the pressurized fluid at each piston in opposition to the swashplate yoke forces will increase with the force at the piston 534 increasing at the fastest rate. Thus motor 82 will become fully disstroked, that is, have its swashplate pivot angularly from a maximum displacement of 18° to 0°, before any of the other motors. Similarly piston 506 will move to fully disstroke motor 80 before piston 480 will move to disstroke motor 78. Hence the sequence in which the motors are disstroked or "cut out" of the active hydrostatic high pressure circuit.

Before continuing into a detailed description of the operation of the automatic low pressure control system it will be necessary to consider the construction and functioning of the gerotor pump 310 and governors 406 and 414 in more detail.

THE GEROTOR PUMP

With specific reference again to FIG. 1, mounted circumferentially within a hollow 13 in the pump housing member 12 about the input shaft 32 is the gerotor pump 310. The gerotor pump is a rotary, positive displacement self priming pump which delivers a relatively pulseless known quantity of pressurized fluid in proportion to its drive shaft's rotational speed. In this transmission, input shaft 32 functions as the gerotor's drive shaft. The gerotor is a valveless unit capable of pumping oil in the same direction regardless of the direction of rotation of the input shaft. The main function of the gerotor pump as utilized in the present invention is to supply pressurized fluid to the low pressure control circuit in proportion to the speed of the input shaft and of the engine, which due to the mechanical linkage through the flywheel are identical.

As can best be seen from FIGS. 8A–8D the gerotor pump 310 utilized here consists of three components: the outer gerotor 550, the inner gerotor 552 and the locating key 554. As already mentioned in relation to FIG. 1 the gerotor pump rests in a hollow 13 in the pump housing member 12 which is bolted to the front cover housing member 12. The front cover housing member has two kidney-shaped openings 556 and 558 which serve respectively as suction and discharge ports for fluid to and from the gerotor. Passageways 560 and 562 (see FIG. 1) which terminates respectively at the suction and discharge ports, are cast into the front cover housing members and serve as means of connecting the gerotor to the sump reservoir and to the remainder of the control circuit.

With particular reference now to FIGS. 8A–8D, it is the gradual volumetric change of the gerotor tooth chambers across the suction port 556 and the discharge port 558 that provides for uniform flow with a minimum of pressure variation. This pumping "action" is made possible by constructing the inner gerotor element to always have one tooth less than the outer element. The volume of the "missing tooth" multiplied by the number of the driver teeth determines the volume of fluid pumped per revolution. The number of teeth may vary depending on design consideration but the inner element always has one less tooth than the outer gerotor element.

Figure 8B:
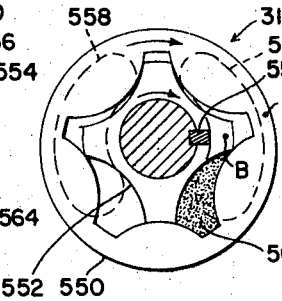
Figure 8C:
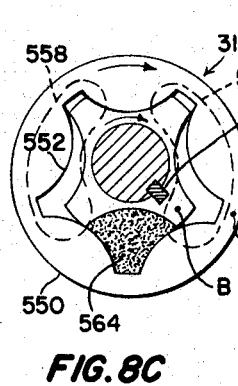
Figure 8D:
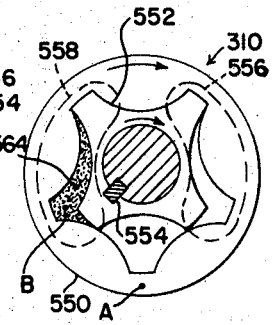

The two elements revolve in the same direction with low relative speed with respect to each other as the inner gerotor element 552 advances with respect to the outer element 550 only one tooth space per revolution. Thus it is possible for a unit situated about a drive shaft operating at 1800 r.p.m. to have its two elements revolving with respect to each other at only 300 r.p.m. A typical gerotor pump cycle will now be described. FIG. 8A illustrates the inner and outer elements situated such that fluid is entering tooth chamber 564 (as represented by the shaded area) through the aforementioned kidney-shaped opening in the front cover housing member. Note the two reference points A and B shown on the outer element and inner elements, respectively, to aid in following the relative motion between the two elements. FIG. 8B illustrates the toothed elements mounted on fixed centers but eccentric to each other, turning, the chamber 564 between the teeth of the inner and outer elements gradually increasing the size through approximately 180° of each revolution until it reaches a maximum size, which is the volume of the "missing tooth." Rotation then continues until the gradually enlarging chamber is exposed to the suction port creating a partial vacuum into which the liquid flows. FIG. 8C illustrates the "missing tooth" filled with fluid (the shaded area) as the inner element 552 seals off the suction port 556 with respect to chamber 564. FIG. 8D illustrates the inner element 552 moving into the second 180° of its revolution gradually decreasing the size of chamber 564 as the teeth mesh and the liquid is forced out the discharge port 558.

With reference now to FIG. 1, from the discharge port the fluid enters a radial channel 566 contained within the inner shaft 32 and flows into an axial channel 568 which extends from channel 566 to a similar though slightly larger axial and longitudinal channel 570 in the output shaft 60. These two channels provide the means of supplying fluid from the gerotor to two governor units, 406 and 414, one each located as earlier described about the input shaft 32 and the output shaft 60. The governors are in effect centrifugally operated bleeder valves sensitive to the rotational speeds of the shafts about which they are mounted. These will be described hereinafter in detail.

Note that channel 568 is stepped at its right extremity, and inserted into this stepped chamber 572 is the restrictor pin 412 which has an axial channel 413, the diameter of which is considerably smaller than the diameter of channel 568 and which restricts fluid flow to the axial channel 570 of the output shaft 60. The restrictor pin functions to restrict fluid flow to the output governor 414 thereby making the low pressure control circuit less responsive to the rotational speed of the output shaft, the degree of sensitivity being dependent upon the diameter of the axial channel 413 within the restrictor pin. Also at the juncture of the input and output shafts as seen in FIG. 1, is a radial passage 574 which serves as a means of diverting a minute portion of the fluid flow to the output carrier 62. A seal is provided at 576 to minimize leakage at this point. Also extending radially from the axial channel 570 in the output shaft 60 is a channel 571 communicating with an annular chamber 573 from which extend channels 392 and 578 which as shown in FIG. 6 direct low pressure fluid flow to the two motor cutout valves 110 and 112, of which only valve 110 is shown in FIG. 1.

THE GOVERNORS

The two governor units 406 and 414, one each located at the input shaft 32 and the output shaft 60 as shown in FIG. 1, are centrifugally operated bleeder valves, the input governor 406 being sensitive to engine speed and the output governor 414 to the speed of the output shaft 60 and hence, to torque demands made on the system. Functionally and physically the two governor units are identical, thus only a description of the construction of the output governor will now be considered.

With particular reference to FIG. 9, the assembled governor unit 600 is annular in form so that it may be mounted about the aforementioned shafts. It is comprised of an inner single spacer ring 602 and an outer ring comprised of two identical semi-circular flyweight members 604 and 606. These concentric rings are secured to the shaft 60 by means of anchor bolts 608 and 610 spaced 180° apart about the shaft. The inner ring serves only a spacing function and may be omitted in such instances where the diameter of the shaft is larger. Within the two flyweight members each anchor bolt rests within a spherical seat, the head of the anchor bolt in contact with the spherical seat having a corresponding mating spherical surface thereby providing means whereby each flyweight member may pivot about its respective anchor bolt in response to pressure variations within the low pressure control circuit.

In addition to the two threaded anchor bolt holes the inner ring 602 has four radial bores 612, 614, 616, and 618 spaced at 90° intervals about its circumference, two of which (614 and 618) when ring 602 is properly aligned about the shaft are placed directly over two radial passageways 620 and 622 within the shaft which emanate from the central and axial longitudinal channel 570 of shaft 60. Similar radial passageways in the input shaft emanate from the central passageway 568 in the input shaft. Opposing these four radial bores within the inner ring are cylindrical-like bores 612a, 614a, 616a, and 618a in the inner wall of the outer ring flyweight members, none of which penetrate through the flyweight members. This placement of the radial bores in the inner ring and in the flyweight members in opposition results in the formation of four cylindrical-like compartments in which are housed two helical springs 624 and 626, spaced 180° apart, and two metal balls 628 and 630 similarly spaced. Note that the anchor bolts are placed in such a manner that they divide the arc length of each flyweight member such that the sections of the flyweight members 604a and 606a housing the helical springs have twice the arc length of those sections 604b and 606b of the flyweight members which house the metal balls.

Each spring when placed within its aforementioned compartment is partially compressed to provide slight reaction forces which act upon the shaft 60 in an inwardly direction and against the top wall of the compartment in an outwardly direction to create with the aid of the metal balls the annular air space 632 between the inner and outer rings. The helical springs function to prevent rattling of the flyweight members against the inner ring when the vehicle engine is starting up from rest and at low engine speeds. The spring force is slight and is of no significance when compared to centrifugal forces developed at the flyweight members as the speed of the shaft increases to several hundred r.p.m.

The metal balls 628 and 630 which function as ball type variable restriction valves regulating oil flow from the gerotor pump are seated across the mouths of the radial passageways 620 and 622 when the vehicle is at rest or operating at very low speeds such that these passageways are effectively sealed. This is so because the oil pressure developed within the radial passageways by the gerotor is insufficient to overcome the forces acting in the opposite direction developed by the anchor bolt and helical spring.

As the two metal balls and both flyweight members undergo the same force actions and reactions we will now only consider metal ball 628 and flyweight member 604. As the speed of the output shaft increases centrifugal forces are developed which act upon flyweight member 604 tending to urge the member 604 outwardly away from the rotating shaft. However, as earlier noted the arc lengths of the two sections 604a and 604b are not equal, the arc length of 604b being twice the arc length of section 604a. Thus the centrifugal forces acting upon section 604b and pivoting about the anchor bolt, being twice as large as the centrifugal forces acting upon section 604a, tends to urge section 604a inwardly thereby urging the ball 628 to seat itself across the mouth of the radial passageway. However, as oil pressure developed by the gerotor pump 310 within the control circuit increases with the rotational speed of the input shaft, the force developed on the underside of the metal ball 628 by said oil pressure will overcome the developed centrifugal forces and unseat the metal ball thereby allowing fluid to leak out of the radial passageway 620 into the spatial area 632 between the inner and outer rings of the governor unit. Leakage will continue until the force developed on the underside of the metal ball, which will begin diminishing as leakage occurs, is once again exceeded by the developed centrifugal forces acting upon the flyweight member 604. At that time the metal ball 628 will again be urged toward the mouth of the radial passageway. In effect the metal ball will be riding on a cushion of oil leaking out of the radial passageway. This leakage to some extent will always be present, though in varying degrees as it is dependent on the developed centrifugal forces, once the speed of the shaft has increased to several hundred r.p.m. As can best be seen from the low pressure control circuit schematic of FIG. 7, the effect of such oil leakage within the governor unit is to cause the fluid pressure developed within the control circuit to drop thereby reducing the pressure acting upon the several control pistons and cutout valves, and consequently varying the forces regulating the swashplate angles of the pump and motors and the forces acting upon the faces of the cutout valves. Also note that while the present control circuit of FIG. 7 utilizes two governor units, one each located at the input and output shafts, a single governor unit located at the input shaft could be utilized if all that was desired was a circuit sensitive solely to engine speed.

As to the oil which has leaked out from the radial passageways into the spatial area 632 between the inner and outer rings of the governor unit, said oil will escape from this spatial area through openings 634 and 636 with sufficient momentum to be splashed upon the various hydraulic components located about the governor where the oil serves to perform a lubricant function; from there the oil will drain down the sides of the interior walls of the transmission housing and return to the sump.

OPERATION OF THE HYDROMECHANICAL TRANSMISSION

As noted earlier (particularly with reference to FIG. 1A) the flow of power within the transmission is through two paths, the first path transmitting mechanically at all times a torque nearly equal to the input torque, and a second path transmitting a torque varying in magnitude from zero to a maximum of approximately 5300 ft.-lbs. less the input torque. The following formula expresses the torque ratio of the present transmission:

$$R = 1 \pm \frac{KM}{P}$$

where

R = the theoretical torque ratio
M = in degrees, the total angular displacement of the swashplate of all hydraulic motors in the transmission
P = in degrees, the angular displacement of the pump's swashplate
K = a constant of 1.29

The plus sign applies when the vehicle is operating in a forward drive setting and the minus when the vehicle is in reverse.

The angular displacement of the swashplate of each of the motors and the pump may be varied from a zero position to a given maximum angle. Minimum displacement occurs as the swashplates of the motors tend to approach zero degrees and for the pump when the swashplate is at zero degrees. Maximum displacement for all hydraulic motors and the pump is 18°. As is obvious from the above formula the torque ratio can be varied from infinity to 1/1 by varying the angular displacement of the pump and motor swashplates. For example, when the vehicle is idling the angular displacement of the pump, due to negative yoke forces acting upon the pump is at its minimum position of zero degrees whereas the motors which are subjected to positive yoke forces tend to stroke to their maximum displacement of 18°. For this condition the torque ratio is infinite. As the vehicle is accelerated from its idling condition the pump swashplate is rapidly displaced from this minimum position to its maximum displacement. This condition produces a torque ratio of 4.9 as $$R = 1 + \left(3 \times 1.29 = \frac{18°}{18°}\right)$$

FIG. 10 is indicative of the power distribution at this condition. Moving vertically up the ordinate of the graph beneath the torque ratio valve of 4.9/1 the distance of $a$ to $b$ indicates the amount of torque delivered to the rear wheel mechanically and the distance of $b$ to $e$ indicates the amount of torque delivered hydraulically by the transmission. Distances $b$ to $c$, $c$ to $d$, and $d$ to $e$ indicate the amounts of torque delivered by motors 82, 80 and 78 respectively.

Further reduction of the torque or speed ratio is accomplished by sequentially reducing the motor swashplates to their minimum displacement and valving the motors out of the active circuit. First motor 82 is disstroked to its minimum displacement angle at which time $$R = \left(1.29 \times 2 \times \frac{18}{18}\right) = 3.6$$

Reference to FIG. 10 indicates that for this torque ratio value that the distance $a$ to $c$ now represents the amount of torque distributed mechanically as motor 82 no longer delivers torque to the vehicle's rear wheels. Distances $c$ to $d$ and $d$ to $e$ continue to represent the amounts of torque delivered by motors 80 and 78 respectively. Further reduction of the torque causes the swashplate of motor 80 to swing from its maximum displacement of 18° to its minimum displacement at which time motor cutout valve 112 (see FIG. 6) will move to the right from position 112a to position 112b where valve spool 342 will engage valve seat 343. The result of the valve movement is to remove motors 82 and 80 from communication with the high pressure side of the pump. This is the forward intermediate drive range of the vehicle for which the configuration of the high and low pressure circuits is illustrated in FIG. 11. In the forward intermediate range, the torque ratio of the vehicle will be $$R = 1 + \left(1.29 \times 1 \times \frac{18}{18}\right) = 2.3$$

Reference to FIG. 10 indicates that there is now delivered mechanically the amount of torque represented by the distance $a$ to $d$ with motor 82 and 80 no longer delivering any torque. Distance $d$ to $e$ continues to represent the amount of torque delivered by motor 78. Thus it is obvious that as the torque ratio is reduced a continuously increasing percentage of the power is transmitted through the mechanical power path.

Further reduction of the torque ratio is achieved as motor 78 is disstroked. When the swashplate of motor 78 reaches its minimum displacement angle at which time the torque ratio becomes 1/1 and motor cutout valve 110 will move in a downward direction from its position at 110a to its second operating position at 110b (see FIG. 6), at which position valve spool 332 engages valve seat 333 preventing further high pressure fluid flow from channel 328 through valve chamber 330 to channel 336. FIG. 12 illustrates the high and low pressure circuits for direct forward drive. With high pressure fluid flow to the motors 78, 82 and 84 prevented by the internal valving of the control circuit, the hydromechanical transmission at the torque ratio setting of 1/1 is locked hydraulically into a direct mechanical drive with all power being transmitted solely through the mechanical power path. In FIG. 10 the vertical distance $a$ to $e$ under the torque ratio of 1/1 represents that all of the torque developed by the transmission now flows solely through the mechanical path.

Though the above is concerned primarily with torque ratios produced at specific instances, such as when the swashplate of either the pump or the motors are fully displaced or disstroked, it is obvious that it is possible for the displacement of these components to be varied to give an infinite number of intermediate ratios of torque and power dependent upon the speed and torque demands made upon the transmission at any one given instance. The capability of the control circuit to provide automatically for this infinite variability of the torque ratio in response to load and speed demands by valving out hydraulically the motors sequentially when their volumetric efficiencies are minimal, makes for an extremely efficient hydromechanical transmission.

CIRCUIT STATUS—IDLE CONDITION

Again with particular reference to FIGS. 6 and 7, the following is a detailed description of the functioning of the high and low pressure circuits of the present hydromechanical transmission under typical operating conditions. Assuming first that the vehicle is loaded and idling at a red traffic light, the pump swashplate angle at this condition will be near its minimum displacement of 0° pumping only a sufficient amount of fluid for lubricating purposes, whereas the three motor swashplates are at their maximum angularity so that maximum starting torque is available when the vehicle starts to move. As the traffic light changes to green and the vehicle operator depresses the treadle, power is engaged initially by increasing the pump's displacement while the motor's displacements remain constant. As the inertia of the load makes it impossible to accelerate immediately, part of the pump output is diverted from channel 320 to channel 322 where it passes over the high pressure relief valve 308. However, as the motors speed up they take up more of the pump discharge and less flows over the relief valve, until finally all of the pump discharge is to the motors. At such time the system high pressure will have varied from a high slightly in excess of 7000 p.s.i. to approximately 4500 p.s.i., and the pump swashplate will have gone from minimum angular displacement to its maximum displacement of 18°.

Within the low pressure control circuit at this time while the vehicle is idling, the speeds of the input and output shaft will be insufficient to develop the necessary centrifugal forces needed to prevent completely leakage at the governor units; and with this leakage forces of sufficient magnitude are not developed at the pressure faces of any of the control pistons to resist the natural tendency of the pump and motors to assume the displacements earlier indicated. This condition which is necessary at idle and at low speeds to prevent the vehicle from stalling continues to exist until the speeds of the shafts increases as the pedal is further depressed sufficiently to develop the necessary centrifugal forces needed to almost reseat the metal ball in the governor units thereby minimizing further leakage. Note that at this condition of minimum pump smashplate displacement piston 424 will be fully displaced to the left as shown in phantom and that an enlarged portion of stroking rod 430 will be engaging valve seat 442 thereby opening channel 440 to the sump through slidable valve chambers 438 and channel 444. Thus no pressurized fluid acts upon the pressure face 478 of piston 480, nor through channels 476 and 477 upon the face 345 of valve spool 342 of valve 112. However, as best seen in FIG. 6, pressurized fluid from the gerotor pump 310 passing through channel 578 acting upon valve spool 362 urges cutout valve 112 to the left to position 112a assuring that motors 80 and 82 are in communication with the high pressure side of the pump for this drive condition. As to cutout valve 110 there is developed at both sides of the valve by the gerotor pump the same pressure. However, the pressurized fluid of the control circuit passing through channels 398 and 399 acts upon a larger area at valve spool 401 than does the pressurized fluid passing through channel 393 where it is directed to act upon valve spool 332. Consequently, cutout valve 110 will be urged in an upwards direction assuming the position designated at 110a thereby assuring that all three motors are placed in parallel with the high pressure side of the pump 72 at this time.

ACCELERATION FROM REST—ACTIVATION OF PUMP 72

At this time as the pedal is further depressed, pressure will begin to build up in the flow pressure control circuit, and forces will be developed at the pressure faces of the control pistons which will tend to resist the natural tendency of the pump swashplate to assume a minimum angular displacement and of the swashplate of the motors to maintain their maximum angular displacement. As earlier noted the pressure faces of the various control pistons are of varying sizes, control pistons 424 and 534 associated with the pump 72 and motor 82 having the largest pressure areas. Thus the force magnitudes developed at these two pistons to counterbalance the yoke forces of the pump and motors will develop at a faster rate than that at the control pistons associated with motors 78 and 80. Consequently, the pump swashplate 436 which has at this time, when it is at its minimum displacement, acting upon its yoke forces of a lesser magnitude than those which are acting upon the fully displaced motor 82, will be fully displaced to the right by the forces acting upon the pressure face 422 of control piston 424. The movement of the piston 424 to the right disengages the enlarged portion of the stroking rod 430 to the right of the reduced section from valve seat 442 again placing channel 396 in communication with valve chamber 438 and channel 440. Thus low pressure pressurized fluid is allowed to act against the pressure face 478 of piston 480. However, the forces developed by the low pressure fluid at piston 480 at this time are insufficient to overcome the yoke forces acting upon the swashplate 490 of motor 78 and the piston 480 assumes the position indicated by the section lined portion in FIG. 7. As earlier noted the torque ratio at this time is 4.9/1.

DISSTROKING MOTOR 82

As the vehicle continues to accelerate further reduction of the torque or speed ratio is accomplished by disstroking motor 82. Pressure within the low pressure circuit being proportional to the rotational speed of the input shaft which drives the gerotor pump 310 will continue to increase. Thus the force developed upon the pressure face 532 of piston 534 due to said increasing pressure will urge the swashplate 548 of motor 82 to the right towards its minimum displacement setting shown in phantom. At this time the swashplate of motors 80 and 78 remain fully displaced as the forces developed at the pressure faces 478 and 506 of control pistons 480 and 508, said piston areas being of lesser size than pressure face 532 of control piston 534, are of insufficient magnitude to overcome the yoke forces acting upon said swashplates. As to cutout valves 110 and 112, there is no change in their positioning at this time. As earlier noted the torque ratio at this time is 3.6/1.

DISSTROKING MOTOR 80

Further reduction in the torque ratio occurs at both engine speed and speed of the input shaft continue to increase causing pressure within the low pressure control circuit to increase. With the increase in low pressure, the fluid acting upon the pressure face 504 of piston 508 develops sufficient forces to urge the piston, and hence the swashplate 518 of motor 80 to the left. Piston 480 associated with motor 78 remains unaffected at this time due to the lesser pressure face area.

DEACTIVATION OF MOTORS 80 AND 82

When the piston 508 is fully displaced to the left as shown in phantom and the motor swashplate has been fully disstroked, piston stroking rod 516 will have moved from the position indicated by the section lines to the phantom line position at 520a. This movement of the stroking rod 516 places channel 476 in communication with channel 477 through valve chamber 524. Thus pressurized fluid from the gerotor pump is allowed to act upon the pressure face 345 of valve spool 342 of cutout valve 112 for motors 80 and 82. Since the same pressure acts upon valve spools 342 and 362 of cutout valve 112, but in opposition, and since pressure face 345 of valve spool 342 presents the larger area than face 363 of spool 362, valve 112 will now be urged to the right with cutout valve 112 assuming position 112b. In this position, the valve spool 342 engages valve seat 343 and high pressure fluid flow to motors 80 and 82 is cut off. Thus motors 80 and 82 have been hydraulically deactivated, the oil pressure at these two motors having been lowered from a pressure of several thousand p.s.i down to a pressure just adequate to maintain sufficient lubrication. At this time, only motor 78 is still fully stroked and remains in the active circuit. The torque ratio is 2.3/1. The configuration of the components of the high and low pressure circuits under these circumstances is illustrated in FIG. 11.

DISSTROKING AND DEACTIVATION OF MOTOR 78

As the vehicle still continues to accelerate further reduction in torque ratio is accomplished by disstroking the swashplate 490 of motor 78. With further acceleration the gerotor output pressure continues to increase until there is built up at pressure face 478 of piston 480 adequate pressure to overcome the yoke forces acting upon the swashplate 490 and to develop the necessary force needed to displace the piston to the right as viewed in FIG. 7. When the piston has been fully displaced to the right, as shown in phantom, an enlarged portion of piston stroking rod 482 will engage valve seat 496 thereby cutting off pressurized flow from channel 398 to channel 399 and placing channel 399 in communication with the sump through slidable valve chamber 494 and channel 498. Consequently fluid within channel 399 will drain to the sump and valve 110, due to pressure within channel 393 of FIG. 6 acting upon valve spool 332, will be displaced downwards until the valve bottoms within chamber 391. Valve spool 332 will at this time engage valve seat 333 thereby cutting off all high pressure flow to channel 336 and to motor 78. Thus as with motors 80 and 82, motor 78 has been hydraulically deactivated from the active hydrostatic circuit, the oil pressure in motor 78 being reduced from several thousand p.s.i. to a pressure just adequate to maintain lubrication. Consequently, at this time, the vehicle is in a direct mechanical drive and the torque ratio is 1/1. The configuration of the components of the high and low pressure circuits under these circumstances are shown in FIG. 12.

ACCELERATION ACTUATED DOWN SHIFT

When operating in the direct mechanical drive ratio, the transmission will automatically down shift at a predetermined speed of approximately 20 m.p.h. However, should the vehicle operator desire to down shift at a higher vehicle speed, let us say 40 or 50 m.p.h., as he might desire to do when passing another vehicle on a highway or when driving the vehicle up a hill, he may do so by depressing the accelerator pedal 464 (see FIGS. 7 and 12) to the floor consequently depressing contact button 456 and thereby completing an electrical circuit which supplies electrical power from the vehicle battery (not shown) through wires 457 and 458 to the solenoid valve 452. As earlier noted with the transmission in direct mechanical drive and with the solenoid valve in its normal or de-energized state, the plunger rod 450 is positioned as shown in FIG. 12 and by the solid lines in FIG. 7 allowing fluid to flow unrestricted from channel 440 through annular valve chamber 446 and out to channel 454. However, when the solenoid valve 452 is energized by full depression of the accelerator pedal 464, plunger rod 450 is urged to the left as shown in phantom in FIG. 7 whereby the enlarged tail portion 468 of rod 450 is now positioned at 468a where it engages valve seat 470 thereby shutting off fluid flow from channel 440 into the sliding valve chamber 446. In this setting valve chamber 446 is placed in communication with the sump through channel 472 thereby allowing the pressurized fluid which had been acting upon control piston 480 to exhaust through channel 454 through valve chamber 446 to the sump. And with no pressurized fluid acting any longer upon the control piston 480 to offset the yoke forces developed by motor 78, the swashplate 490 of motor 78 will upon the urging of spring 486, which had been fully compressed by piston 480, tend to swing from 0° towards its maximum angular displacement position of 18°. Simultaneously with the movement of the swashplate assembly 440 from its minimum displacement of 0° towards 18° is the movement of the reduced portion 492 of the control piston rod 482 to the left. As a result of this movement of the control piston rod, channel 399, which had been in communication with the sump through valve chamber 494 and channel 498, is now placed in communication through chamber 494 with channel 398. Consequently pressurized fluid from the gerotor pump 310 once again is directed through channels 398 and 399 to valve chamber 391 of cutout valve 110 (which is bottomed at this time at position 110b) where it acts upon pressure face 403 of valve spool 401; and inasmuch as the same gerotor pressure is now acting upon both sides of the cutout valve, the valve is urged in an upwards direction as the force developed at pressure face 403, the larger of the two pressure face areas 331 and 403, is larger than the force developed at pressure face 331 of valve spool 332.

With this upward movement of cutout valve 110 to position 110a, motor 78 which has been hydraulically deactivated is once again placed in line with the high pressure side of pump 72. Pressurized fluid now flows from the pump through channel 320 to valve chamber 324 of valve 108 and out to channel 328 which terminates at valve chamber 330 of valve 110, the latter being in communication with motor 78 through channels 336 and 338.

At this time, the pressure within chamber 528 of the motor cutout valve 112 is also relieved by a connection to the sump 300 through a path from chamber 528 (FIG. 6), via conduit 477 (FIGS. 6 and 7), valve chamber 524 (FIG. 7), passage 476, chamber 474, passage 454, chamber 446, and passage 472. This restores the valve 112 to its 112a position where high pressure from pump 72 is connected from passage 336 (FIG. 6) via chamber 340 and passages 346 and 348 to motors 80 and 82. Since motors 80 and 82 are fully disstroked at this time, they are merely prepared for operation should that be necessary. If however, the additional torque made available by the hydraulic reactivation of motor 78 is not sufficient to meet the additional torque demands made upon the transmission, the vehicle and engine speed will begin to drop. As the engine slows down, gerotor pump speed will also be reduced causing pressure within the control circuit to drop, said pressure being further reduced by additional leakage at the two governors as the centrifugal forces tending to seat the metal balls are reduced at a faster rate than the balancing forces created by control system pressure acting upon the underside of the metal balls. With this drop in pressure within the control circuit, the balancing force developed by said pressure acting upon the pressure face 504 of piston 506 is reduced to a level whereby the yoke forces acting upon the swashplate assembly 518 of motor 80 are once again able to urge the swashplate to the right towards its maximum displacement. This movement of swashplate 518 causes the piston stroking rod 516 to also move to the right thereby placing channel 477 in communication with the sump through slidable chamber 524 and channel 526. The loss of pressurized fluid within channel 477 and valve chamber 528 which occurred upon energization of solenoid valve 452 is thus maintained through passage 526 as rod 516 moves to the right as viewed in FIG. 7.

The flow of high pressure fluid from channel 346 to motor 80 is also directed to channel 348 and motor 82. However, while said flow re-activates motor 82, the swashplate 518 of motor 82 will remain at its minimum angular displacement setting until motor 80 has been fully stroked to its maximum swashplate displacement setting of 18°. At that time if additional torque is required, motor 82 will start to stroke and the swashplate 548 will be urged towards its maximum displacement setting.

In this manner additional torque is made available by manual down shifting after the transmission has assumed its direct drive mode of operation. The motors are sequenced into the active hydrostatic individually in response to increase in torque requirements.

AUTOMATIC DOWN SHIFT

As noted above, the transmission will automatically down shift at about 20 m.p.h. This occurs due to the accompanying decrease in pressure at the outlet of pump 310 which is effective initially through the path formed by passage 396, chamber 438, passage 440, chamber 446, passage 454 to reduce sufficiently the pressure in chamber 474 to permit the compressed helical spring 486 to displace piston 480 to the left thereby reactivating motor 78 substantially as described above. The sequential reactivation of motors 78, 80 and 82 proceeds as described above with the exception that there is a gradual lowering of the pressure from pump 310 in the passages 440, 454 and 476 and the passage 477 is only connected to the sump 300 as rod 516 is restored toward the 18° position of swashplate 518 for motor 80.

REVERSE

The configuration of the high and low pressure circuits for reverse drive is shown in FIG. 13. As is there indicated, when the valve 108 is shifted to reverse while the engine is idling, the high pressure outlet 320 from pump 72 is connected to what for forward drive would be the exhaust ports for motors 78, 80 and 82 via conduits 320 and 354 and the ports of motors 78, 80 and 82 which for forward drive are the inlet ports connected to the sump 300 via conduits 348, 346, 336, 328 and 388, motor cutout valves 110 and 112 being in their 110a and 112a positions respectively as shown. In the low pressure circuit, with the engine idling, the swashplate 436 of the pump 72 is at its normal 0° position and the swashplates 490, 518 and 548 of motors 78, 80 and 82 are in their 18° positions respectively. Acceleration of the engine with resultant progressive increase in the pressure at the outlet of pump 310 successively shifts pump swashplate 436 to its 18° position and disstrokes motor 82, as the torque requirements gradually decrease as the vehicle picks up speed in the reverse direction is substantially the same way as when the vehicle is accelerated from rest under load in the forward direction as described above.

HYDROSTATIC BRAKING

The hydrostatic braking system of the present invention, as illustrated best in FIG. 14, utilizes a brake valve similar to that illustrated in said United States Patent.

As disclosed wtihin U.S. Pat. No. 3,303,901, the brake valve is simply a differential type pressure modulating valve intended to provide for a variable restriction of hydraulic fluid flow through the valve to the sump. Briefly the valve consists of a side inlet port 850 which is in communication with channel 368 (as best seen in FIG. 14), a single metal sleeve 852 normally biased to the illustrated position by spring 854, a stepped annular chamber 856, and an exhaust port 858. Rod 860 is part of the mechanical linkage to a foot operated brake pedal (not shown). Assuming the vehicle to be in direct mechanical drive, depression of said brake pedal will meter flow of fluid through the valve by moving spool 862 upwards against the normal biasing force of spring 860 thereby reducing the cross-sectional area of the opening at port 850. Consequently, fluid flow from channel 368 through the brake valve to channel 370 and to the sump is restricted. This restriction, when the directional control valve is set in a forward drive setting (this braking system is available only when the vehicle operates in a forward direction), causes pressure to rise within channel 368. The rising pressure existing on the exhaust side of the motors will continue to rise until there is a reversal of the pressure differential between the intake and exhaust lines of motor 82, i.e. the exhaust line will possess a higher pressure than the intake line of the motors. As a result motor 82 begins to operate as a pump injecting energy in the system which acts as a resistance, or a torque reversal, at the wheels of the vehicle.

With specific reference to FIG. 14, the reverse pressure buildup within channel 368, caused by depression of the brake pedal to restrict exhaust flow through the brake valve, flows through channel 542 into piston chamber 530 where it acts upon the "reverse" face 536 of piston 534 causing the piston plate 534 to move to the right. Said movement of the piston plate and its integral stroking rod 544 causes the swashplate assembly 548 of motor 82 to pivot counterclockwise from its minimum displacement of zero degrees. As the pressure acting upon the "reverse" face 536 of piston 534 is many times larger than the gerotor's control circuit pressure acting upon the pressure face 532 of piston 534, movement of the piston to right in response to the reverse pressure buildup within piston chamber 530 is immediate. The control pressurized fluid forced out of piston chamber 520 will flow into channel 400 from where it is directed to channel 396 to channel 402 through the governor units 406 and 414 to the sump. In effect the control piston functions as a pump during the period of evacuation of the control pressurized fluid from the piston chamber in response to the reverse pressure buildup. This causes pressure to buildup within the control circuit, which coupled with the drop of rotational speed of the input and output shafts during the braking operation, reduces the developed centrifugal forces acting upon the metal balls within the governor units. Thus there is increased leakage at the governor units as the piston 534 moves to the right in response to the reverse pressure buildup. Also note that the greater the restriction of the inlet port 850 of brake valve 312, the higher the reverse pressure buildup, and the greater the angular displacement of the swashplate 548 of motor 82, and the more difficult it becomes to turn the output shaft which is geared to motor gear 88 through its center gear.

The oil within the high pressure circuit does all the braking work, absorbing the heat generated by the braking action. However, the pumping action of motor 82 circulates oil through the brake valve to channel 370 to the heat exchanger where the generated heat is harmlessly dissipated and the cool oil is allowed to return to the sump to repeat the cycle.

The positioning of the motor cutout valves 110 and 112 in FIG. 11 during the braking operation is such that the motor 82 is able to drawn upon the sump during its pumping operation. This "intake" path is as follows: fluid is drawn up from the sump 300 through channels 318 and 319 into slidable annular valve chamber 330 of cutout valve 110. From valve chamber 330 fluid is directed through channel 336 which is in communication with an annular valve chamber 340 of motor cutout valve 112.

From valve chamber 340 fluid is directed to channel 346 and on through motor 80 to channel 348 which terminates at the intake side of motor 82.

The above braking system may be also made to function automatically by having the hydrostatic brake engaged when the driver lifts his foot from the accelerator. Thus under normal stop and go driving conditions in congested areas, the driver accelerates to mid-block and allows the hydrostatic brake to accelerate the vehicle to a complete stop at the end of the block by merely lifting his foot from the accelerator pedal.

The invention may be embodied in other specific forms without departing from the spirit or essential characteristics thereof. The present embodiment is therefore to be considered as illustrative and not restrictive, the scope of the present invention being indicated by the appended claims rather than by the foregoing description, and all changes which come within the meaning and range of equivalency of the claims are therefore intended to be embraced therein.

What is claimed and desired to be secured by Letters Patent is:

1. In a transmission assembly, means defining a housing structure having spaced compartments, a fixed internal housing member disposed between said compartments, an input shaft in one of said compartments, torque transmitting gearing in said one compartment operably connected to be driven by said input shaft, a hydraulic torque transmitting assembly in the other compartment comprising a pump and at least one hydraulic motor, means mounted on said member drive connecting said gearing to said pump, an output shaft drive connected to said hydraulic torque transmitting assembly, means in said housing providing a hydraulic system for said hydraulic torque transmitting assembly comprising a sump, passage means interconnecting said pump and motor and connecting the pump and motor to said sump disposed substantially wholly in said housing member, movable control valve means mounted in said passage means between said pump and motor, and means for displacing said control valve means.

2. In the transmission assembly defined in claim 1, there being a plurality of motors connected to said pump by said passage means, and there being at least two control valve means movably mounted in said passage means, one at the outlet of said pump and the other located to control flow of fluid to one said motor while permitting flow of fluid to the other motor.

3. In the transmission assembly defined in claim 1, said housing member serving as a transverse wall separating said housing into longitudinally separate compartments, with said output shaft extending coaxially of said input shaft through said housing member and said other compartment.

4. In the transmission assembly defined in claim 1, a fixed tube surrounding the output shaft within said other compartment and extending from said housing member to the rear of said housing structure.

5. In the transmission assembly defined in claim 1, said hydraulic torque transmitting assembly comprising a plurality of hydraulic motors operably connected to said pump, and the drive to said hydraulic torque transmitting assembly comprising a gear train between said gearing and said pump.

6. In the transmission assembly defined in claim 5, said gearing comprising planet gears arranged about aligned relatively rotatable sun gears on the input and output shafts and said gear train comprising a ring gear within said one compartment driven by said gearing and drive connected to said pump.

7. In the transmission defined in claim 1, said output shaft extending from said one compartment through said housing member and said other compartment, and said hydraulic torque transmitting assembly comprising a pump drive connected to said gearing and a plurality of hydraulic motors grouped around said output shaft in said other compartment, a gear on said output shaft within said one compartment, and said motors having output shafts extending through said housing member and carrying output gears meshed with said gear on the output shaft.

8. In the transmission defined in claim 1, said gearing comprising a rotatable planet carrier on which are mounted side by side sets of planet gears, one of said sets being meshed with a fixed ring gear on the housing and a sun gear on the input shaft, and the other of said sets being meshed with a ring gear mounted for rotation about the output shaft and a sun gear on the output shaft.

9. In the assembly defined in claim 8, said gearing being peripherally contained within an envelope not greater in diameter than said rotatable ring gear.

10. In a transmission assembly, means defining a housing structure having a fixed internal valve housing and hydraulic passage defining member and a sump for hydraulic fluid, an output shaft mounted in said structure, a hydraulic torque transmitting assembly mounted within said structure adjacent said member and comprising a pump and a plurality of fluid motors arranged in a group angularly around said output shaft, means directly drive connecting said motors to the output shaft, means for circulating hydraulic fluid between said sump, pump and motors comprising passage means formed mainly within said member connecting the pump outlet to all of the motors, input means drive connected to said pump, directional flow control valve means movably mounted in said passage means at the pump outlet and means for selectively shifting said directional flow control valve means for selecting the direction of drive of the output shaft by said motors.

11. In the transmission defined in claim 10, there being at least one pressure actuated motor cutout valve means being mounted in said passage means disposed for inactivating an associated one of said motors under certain operating conditions.

12. In the transmission defined in claim 11, said valve means each being slidable spool valves in the passage means.

13. In the transmission defined in claim 10, said pump and motors all being mounted on one side of said member, and said passage means including passages through said one side of said member directly to said pump and motors.

14. In the transmission assembly defined in claim 1, said torque transmitting gearing comprising an internal ring gear and said means drive connecting the torque transmitting gearing to the pump comprising a gear mounted on said internal housing member and meshed with said internal ring gear.

15. In the transmission assembly defined in claim 1, there being a plurality of hydraulic motors distributed angularly around said output shaft, and the output of each motor being geared directly to said output shaft.

References Cited

UNITED STATES PATENTS

| | | |
|---|---|---|
| 3,123,975 | 3/1964 | Ebert _____ 74—687 X |
| 3,282,225 | 11/1966 | Moon. |
| 3,300,000 | 1/1967 | Stoyke. |

ARTHUR T. McKEON, Primary Examiner

PO-1050
(5/69)

UNITED STATES PATENT OFFICE
CERTIFICATE OF CORRECTION

Patent No. 3,528,322　　　　　　　　　　Dated September 15, 1970

Inventor(s) CARL E. SCHOU

It is certified that error appears in the above-identified patent and that said Letters Patent are hereby corrected as shown below:

Column 2, line 27, change "hydomechanical" to -- hydro-mechanical --.
Column 5, line 70, change "abuttnig" to -- abutting --.
Column 8, line 47, change "Transimission" to -- Transmission --.
Column 12, line 18, change "swashplaate" to -- swashplate --.
Column 18, in the formula after line 5, insert "X" above "=".
Column 18, in the formula after line 23, after "R=" insert -- 1 + --.
Column 19, line 59, change "smashplate" to -- swashplate --.
Column 20, line 67, change "at" to -- as --.
Column 24, line 42, change "520" to -- 530 --.

SIGNED AND
SEALED
DEC 22 1970

(SEAL)
Attest:

Edward M. Fletcher, Jr.
Attesting Officer

WILLIAM E. SCHUYLER, JR.
Commissioner of Patents